United States Patent
Mushikabe et al.

(10) Patent No.: US 7,864,207 B2
(45) Date of Patent: Jan. 4, 2011

(54) OPTICAL DISK DRAWING APPARATUS

(75) Inventors: Kazuya Mushikabe, Hamamatsu (JP);
Hisanori Itoga, Hamamatsu (JP);
Tatsuo Fushiki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 479 days.

(21) Appl. No.: 11/873,889

(22) Filed: Oct. 17, 2007

(65) Prior Publication Data

US 2008/0092757 A1   Apr. 24, 2008

(30) Foreign Application Priority Data

Oct. 17, 2006   (JP) ............... 2006-282850

(51) Int. Cl.
*B41J 2/47* (2006.01)

(52) U.S. Cl. .................................... 347/224

(58) Field of Classification Search ............... 347/224, 347/225; 709/213–215; 710/52, 53, 56; 711/110; 369/47.32–47.34
See application file for complete search history.

(56) References Cited

U.S. PATENT DOCUMENTS

| | | | |
|---|---|---|---|
| 5,613,136 A * | 3/1997 | Casavant et al. ............... | 712/28 |
| 5,619,653 A | 4/1997 | Kawauchi | |
| 6,912,566 B1 * | 6/2005 | Barrenscheen et al. ...... | 709/215 |
| 7,362,348 B2 | 4/2008 | Morishima | |
| 7,505,383 B2 * | 3/2009 | Morishima ................. | 369/47.4 |
| 2004/0057356 A1 | 3/2004 | Morishima | |

FOREIGN PATENT DOCUMENTS

| | | |
|---|---|---|
| EP | 1 367 570 A2 | 12/2003 |
| EP | 1 793 380 A1 | 6/2007 |
| JP | 2-10538 A | 1/1990 |
| JP | 6-85852 A | 3/1994 |
| JP | 10-308062 A | 11/1998 |
| JP | 2004-5846 A | 1/2004 |
| JP | 2004-5848 A | 1/2004 |

OTHER PUBLICATIONS

European Search Report dated Jan. 20, 2009 (six (6) pages).
Japanese Office Action dated May 22, 2009 (four (4) pages).
Japanese Office Action dated Sep. 9, 2008 w/English translation (five (5) pages).

* cited by examiner

*Primary Examiner*—Hai C Pham
(74) *Attorney, Agent, or Firm*—Crowell & Moring LLP

(57) ABSTRACT

A system control unit writes image data received from a host apparatus into a first storage regions. Next, the system control unit produces duplication data from the image data written in the first storage region, and then, writes these produced duplication data into a second storage regions. Furthermore, the system control unit furthermore produces duplication data from the image data written in the second storage region, and writes these produced duplication data into a third storage region. As a result, 1 piece of the image data and 2 pieces of the duplication data can be prepared on a buffer memory. The optical disk drawing apparatus draws an image on a drawing layer of an optical disk by employing these image data and duplication data.

10 Claims, 15 Drawing Sheets

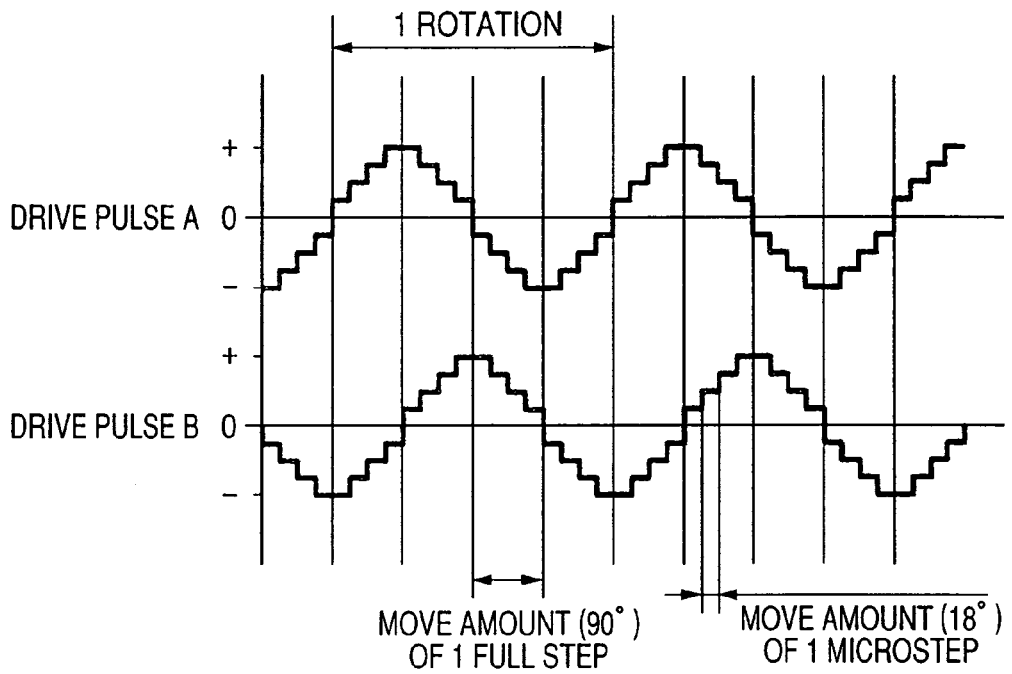
FIG. 5
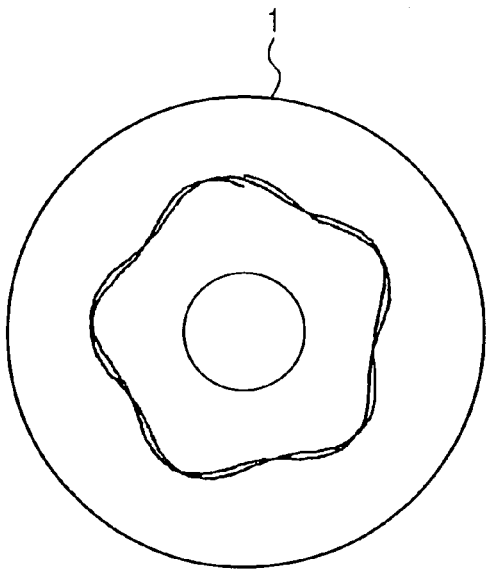 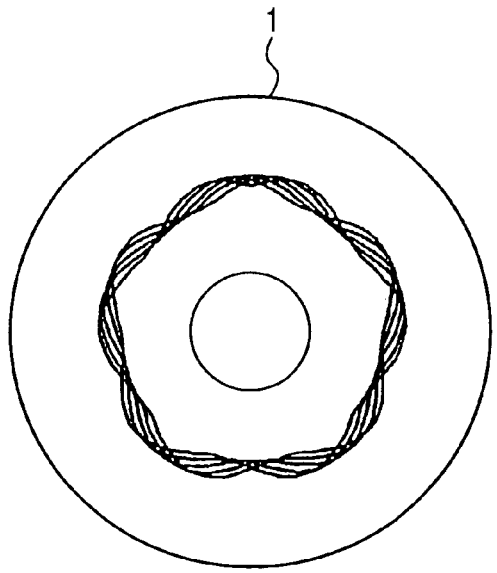
FIG. 6A   FIG. 6B

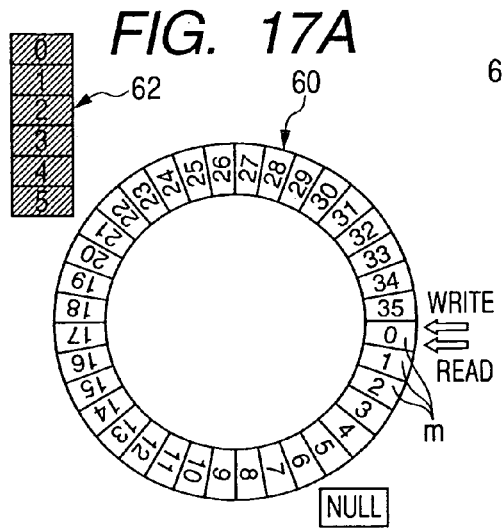
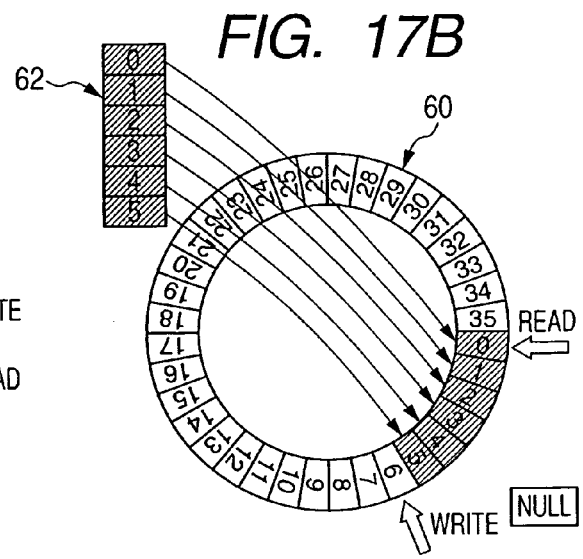
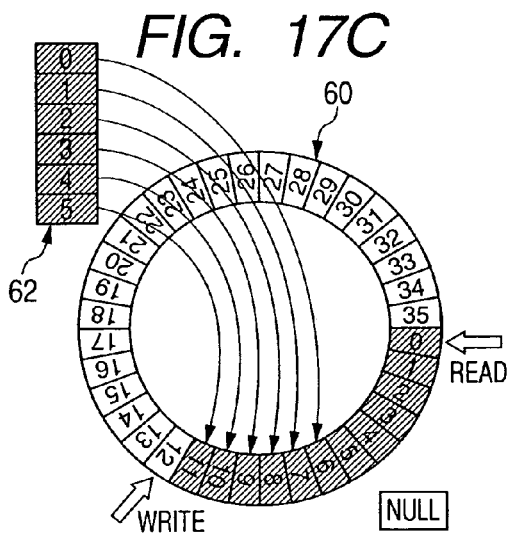
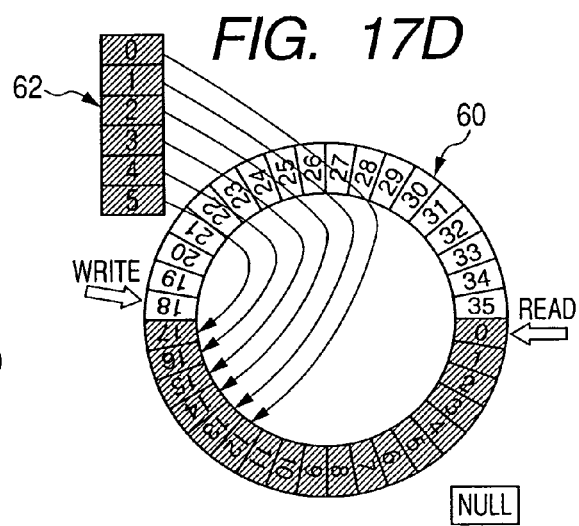
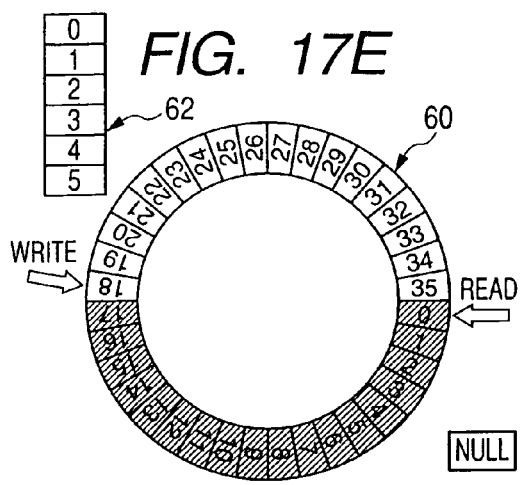

OPTICAL DISK DRAWING APPARATUS

BACKGROUND OF THE INVENTION

The present invention is related to a technique for drawing on an optical disk.

Among optical disks such as CD-R (Compact Disk-Recordable), CD-RW (Compact Disk-Rewritable), and DVD-R (Digital Versatile Disk-Recordable), since contents of recorded data cannot be discriminated from each other by human eyes, it is practically difficult to discriminate the respective optical disks from each other based upon outer appearances of these optical disks. As a consequence, the following technical ideas are proposed: That is, characters, symbols, or figures/pictures are drawn on optical disks, thereby these optical disks can be simply discriminated from each other based upon the outer appearances thereof. For instance, JP-A-2004-5846 discloses such a technical idea that an optical disk drawing apparatus irradiates laser light according to image data onto a discoloring layer formed on an optical disk so as to discolor the laser irradiated region thereof, thereby an image is formed.

On the other hand, in order to freely edit images to be drawn on optical disks by users, it is convenient to employ a host apparatus such as a personal computer which is connected to an optical disk drawing apparatus. The host apparatus can have a superior operability, and are executable of high-performance drawing application programs. In this case, when image data produced by employing the drawing application program are supplied from the host apparatus to the optical disk drawing apparatus, the supplied image data are stored in buffer memory by the optical disk drawing apparatus. Then, image data which is properly read out from the buffer memory is encoded, and the encoded image data is supplied to a laser driver so as to irradiate the laser light onto the optical disk.

When a data amount of image data supplied from the host apparatus to the optical disk drawing apparatus is increased, a communication load between the host apparatus and the optical disk drawing apparatus is increased. As a result, in view of suppression of the communication load, it is desirable to reduce the data amount of the image data supplied from the host apparatus to the optical disk drawing apparatus as small as possible.

Also, there is a case that a pace for supplying image data from the host apparatuses to the optical disk drawing apparatuses cannot follow up reading speeds of the image data by the optical disk drawing apparatus. In this case, there is no image data which should be read out from the buffer memory in the optical disk drawing apparatus. As a result, a so-called "buffer under run error" may occur, so that the optical disk drawing apparatus must interrupt the drawing process operation.

SUMMARY OF THE INVENTION

The present invention is made to solve the above-described problem, and therefore, has an object to reduce a data amount of image data which is supplied from a host apparatus to an optical disk drawing apparatus, and also to avoid such a situation that a drawing process operation is interrupted in the optical disk drawing apparatus.

In order to solve the above problem, the present invention provides the following arrangements.

(1) An optical disk drawing apparatus for drawing an image on a drawing layer of an optical disk, the drawing layer being discolored by receiving any one of heat and light, the apparatus comprising:

a rotating unit that rotates the optical disk;

an irradiating unit that is movable in a radial direction of the optical disk, and irradiates laser light to be focused on the drawing layer of the optical disk rotated by the rotating unit;

a receiver that receives image data indicative of an image drawn on the drawing layer over a time period during which the optical disk is rotated by 1 turn;

a storage having a first storage region and a second storage region;

a writing unit that writes the image data received by the receiver into the first storage region;

a duplication data producer that produces one piece, or plural pieces of duplication data as to the image data written in the first storage region, and writes the produced duplication data in the second storage region; and a drawing unit that causes the irradiating unit to irradiate the laser light onto the drawing layer according to the image data and the duplication data read from the storage while a position of the irradiating unit in the radial direction is maintained within a certain range and the optical disk is rotated by the rotating unit.

(2) The apparatus according to (1), wherein the storage reads and writes the data in an FIFO (First-In First-Out) form, and the second storage region is subsequent to the first storage region, and the duplication data producer produces one piece, or plural pieces of the duplication data from the image data written in the first storage region, and writes the produced duplication data in the second storage region in the producing order of the duplication data.

(3) The apparatus according (1), wherein the storage reads and writes the data in the FIFO form, and the second storage region is subsequent to the first storage region, the duplication data producer produces one piece of the duplication data from the image data written in the first storage region, and writes the produced duplication data with respect to the second storage region, and when the duplication data producer further produces another duplication data, the duplication data producer repeats a process operation that the duplication data producer produces duplication data from the finally written duplication data, and writes the produced duplication data into a third storage region subsequent to the second storage region into which the duplication data is finally written.

(4) The apparatus according to (1), wherein the storage includes a first storage having the first storage region and a second storage having the second storage region in which data are read and written in the FIFO form, the duplication data producer produces one piece, or plural pieces of the duplication data from the image data written in the first storage, and writes the produced duplication data in the second storage in the producing order of the duplication data, and the drawing unit causes the irradiating unit to irradiate laser light onto the drawing layer according to the duplication data read from the second storage.

(5) The apparatus according to (1), wherein
the storage reads and writes the data in the FIFO form, and
when a data writable storage region is not present in the storage, the duplication data producer is brought into a waiting status until the data writable storage region becomes empty, and
when the data writable storage region becomes empty, the duplication data producer writes the duplication data in the data writable storage region as the second storage region.

(6) The apparatus according to (1), wherein the irradiating unit vibrates the laser light in the radial direction so that loci of the laser light on the drawing layer are not overlapped with each other every time the optical disk is rotated.

(7) An optical disk drawing apparatus for drawing an image on a drawing layer of an optical disk, the drawing layer being discolored by receiving any one of heat and light, the apparatus comprising:
a rotating unit that rotates the optical disk;
an irradiating unit that is movable in a radial direction of the optical disk, and irradiates laser light to be focused on the drawing layer of the optical disk rotated by the rotating unit;
a receiver that receives image data indicative of an image drawn on the drawing layer over a time period during which the optical disk is rotated by 1 turn;
a storage;
a encoder that encodes the image data read from the storage predetermined plural times to output plural pieces of the encoded image data; and
a drawing unit that causes the irradiating unit to irradiate laser light onto the drawing layer according to the plural pieces of the encoded image data read from the encoder while a position of the irradiating unit in the radial direction is maintained within a certain range and the optical disk is rotated by the rotating unit.

(8) A method of drawing an image on a drawing layer of an optical disk, the drawing layer being discolored by receiving any one of heat and light, the method comprising:
rotating the optical disk;
receiving image data indicative of an image drawn on the drawing layer over a time period during which the optical disk is rotated by 1 turn;
writing the image data received by the receiver into a first storage region of a storage;
producing one piece, or plural pieces of duplication date as to the image data written in the first storage region, and writes the produced duplication data in a second storage region of the storage; and
irradiating laser light to be focused on the drawing layer of the rotated optical disk according to the image data and the duplication data read from the storage while a position of the irradiating unit in an radial direction of the optical disk is maintained within a certain range and the optical disk is rotated by the rotating unit.

(9) The method according to (8) further comprising moving a light source of the laser light in the radial direction after the irradiating the laser light.

In accordance with the present invention, it is possible to reduce the data amount supplied to the optical disk drawing apparatus from the host apparatus. Also, it is possible to avoid such an event that the drawing process operation piles up in the optical disk drawing apparatus.

BRIEF DESCRIPTION OF THE DRAWINGS

FIG. 5 is a voltage waveform diagram of drive pulses in the case that the stepper motor is driven in a full step drive mode.

FIGS. 6A and 6B are diagrams for illustratively showing overwriting conditions with respect to the optical disk.

FIGS. 17A to 17E are diagrams for explaining another example as to reading/writing operations of image data with respect to the buffer memory.

10: host apparatus, 12: optical disk recording apparatus, 30: spindle motor, 34: optical pickup, 52: encoder, 58: interface, 58: system control unit, 60: buffer memory.

DETAILED DESCRIPTION OF PREFERRED EMBODIMENTS

An optical disk recording apparatus 12 according to an embodiment of the present invention has a function (data recording/reproducing function) capable of recording and/or reproducing data, for instance, music data with respect to an optical disk; and another function (drawing function) capable of drawing an image on the optical disk, which can be visually recognized by a user. In the following description, first of all, a description is made of structures of optical disks themselves, and thereafter, a description is made of a system which contains the optical disk recording apparatus 12.

(1) Structures (1-1) Structures of Optical Disks

Figure 1:
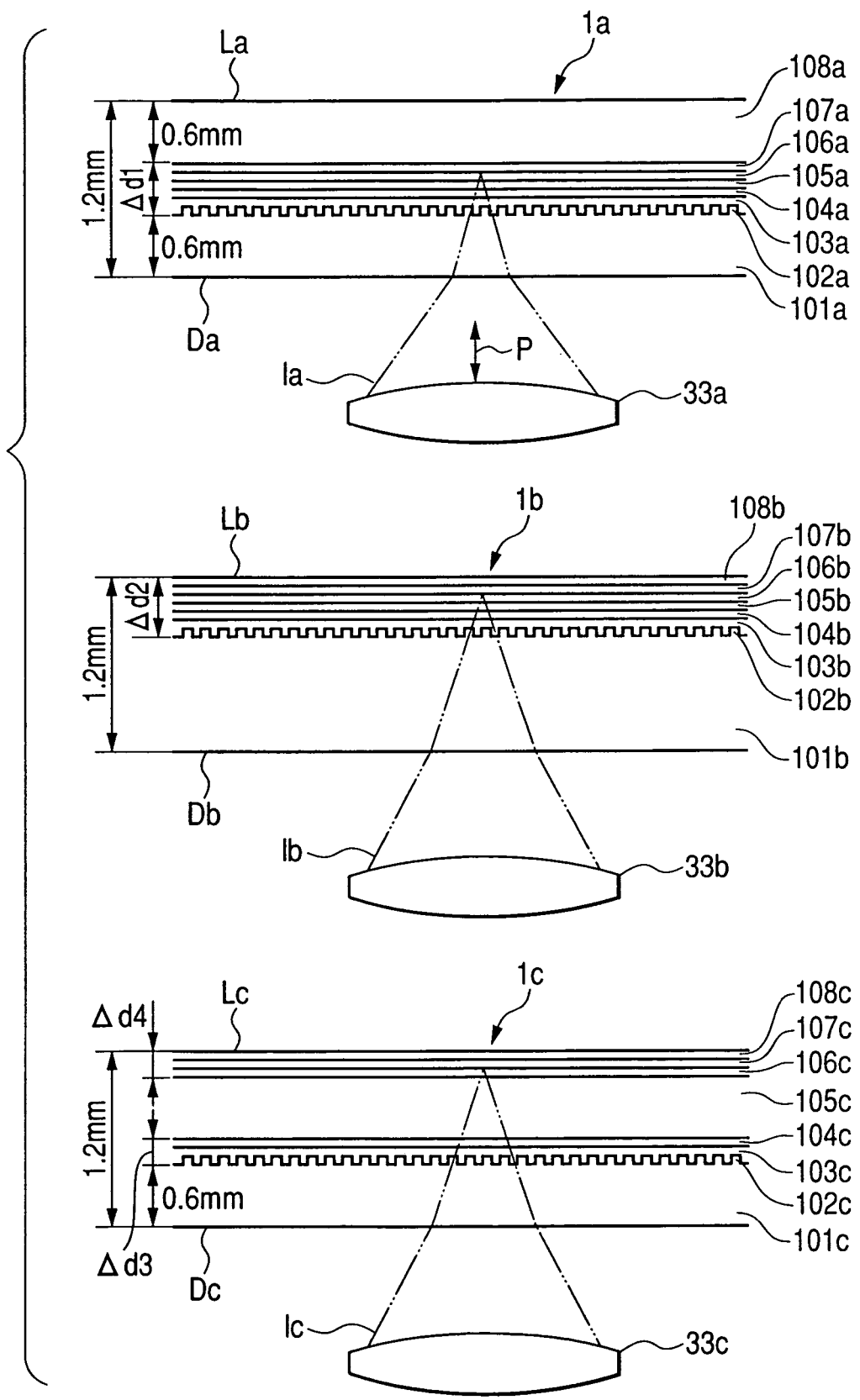
FIG. 1 is a sectional view for showing an optical disk according to an embodiment of the present invention.

As an example of optical disks related to the present embodiment, FIG. 1 shows sectional views as to a DVD-R 1a, a CD-R 1b, and a CD-R/DVD-R mixing type optical disk 1c. In the DVD-R 1a, a polycarbonate layer 101a, a data recording layer 103a, a semi-transparent layer 104a, an intermediate layer 105a, a drawing layer 106a, another semitransparent layer 107a, and another polycarbonate layer 108a are sequentially arranged from a recording surface thereof "Da" toward a label surface thereof "La." While a thickness of the DVD-R 1a is approximately 1.2 mm, each of the polycarbonate layer 101a and another polycarbonate layer 108a has approximately 0.6 mm thickness, respectively, so that a thickness from the data recording layer 103a up to the semi-transparent layer 107a is a very short distance of "Δd1", as compared with the entire thickness of approximately 1.2 mm.

A helical-shaped groove (guide groove) 102a is formed on the side of the recording plane "Da" of the data recording layer 103a. When data is recorded, a position of an objective lens 33a is adjusted to a proper position in an arrow direction "P", and then, a focal point of laser light is focused onto the data recording layer 103a based upon reflection light reflected from the semi-transparent layer 104a. Then, laser light having a strength responding to data which should be recorded is irradiated along the groove 102a of the data recording layer 103a. At this time, pits corresponding to data lengths are formed at places on which the laser light is irradiated, so that a data recording operation is carried out. When recorded data is read so as to be reproduced, such a laser light having a strength weaker than that of the laser light at the time of the data recording operation is irradiated along the groove 102a, and then, a strength of reflection light (namely, returning laser light) is sensed, thereby a data reproducing operation is realized.

The drawing layer 106a is formed by such a material which is discolored when laser light having certain strength is irradiated thereon. When a drawing operation is carried out, the position of the object lens 33a is adjusted to a proper position in the arrow direction "P", and the focal point of the laser light 1a is focused onto the drawing layer 106a based upon reflection light reflected from the semitransparent layer 107a. Then, when laser light 1a having a certain strength is irradiated, a region of the drawing layer 106a onto which the laser light 1a is irradiated is discolored. Such an image which can be visually recognized by a user by this discolored region and another region which is not discolored. It should also be noted that FIG. 1 indicates such a case of irradiating the laser light 1a focused onto the drawing layer 106a.

Next, a description is made of the CD-R 1b. In the CD-R 1b, a polycarbonate layer 101b, a data recording layer 103b, a semi-transparent layer 104b, an intermediate layer 105b, a drawing layer 106b, another semi-transparent layer 107b, and a protecting layer 108b are sequentially arranged from a recording surface thereof "Db" toward a label surface thereof "Lb." A helical-shape groove 102b is formed on the side of a recording surface "Db" of the recording layer 103b. The drawing layer 106b has such a property that when laser light having certain strength is irradiated thereon, the drawing layer 106b is discolored. While a thickness of the CD-R 1b similar to that of the DVD-R 1a is approximately 1.2 mm, a substantially entire thickness is equal to the thickness of the polycarbonate layer 101b, a thickness defined from the data recording layer 103b up to the protecting layer 108b is a very short distance "Δd2."

Basic ideas when data is recorded/reproduced with respect to this CD-R 1b, and when an image is formed on this CD-R 1b are similar to those for the DVD-R 1a. In other words, when the data is recorded, the focal point of the laser light is focused on the data recording layer 103b, and the laser light having strength responding to data which should be recorded is irradiated along the groove 102b. Also, when the drawing operation is carried out, the laser light 1b is irradiated onto the drawing layer 106b where the focal point of this laser light 1b is focused, and thus, a region irradiated by the laser light 1b is discolored. Such an image which can be visually recognized by a user by this discolored region and another region which is not discolored. It should also be noted that FIG. 1 indicates such a case of irradiating the laser light 1b focused onto the drawing layer 106b.

Next, a description is made of the CD-R/DVD-R 1c.

In the CD-R/DVD-R 1c, a polycarbonate layer 101c, a data recording layer 103c, a semi-transparent layer 104c, an intermediate layer 105c, a drawing layer 106c, another semi-transparent layer 107c, and a protecting layer 108c are sequentially arranged from a recording surface thereof "Dc" toward a label surface thereof "Lc." A helical-shaped groove 102c is formed on the side of a recording plane "Dc" of the recording layer 103c. The drawing layer 106c has such a property that when laser light having certain strength is irradiated thereon, the drawing layer 106c is discolored. Similar to the DVD-R 1a and the CD-R 1b, while a thickness of the CD-R/DVD-R 1c is approximately 1.2 mm, a substantially entire thickness thereof is equal to thickness of the polycarbonate layer 101c and of the intermediate layer 105c. A thickness defined from the data recording layer 103c up to the semi-transparent layer 104c is a very short distance "Δd3", and also, a thickness defined from the drawing layer 106c up to the protection layer 108c is a very short distance "Δd4."

Basic ideas when data is recorded/reproduced with respect to this CD-R/DVD-R 1c, and when an image is formed on this CD-R/DVD-R 1c are similar to those for the DVD-R 1a, and CD-R 1b. In other words, when the data is recorded, the focal point of the laser light is focused on the data recording layer 103c and the laser light having a strength responding to data which should be recorded is irradiated along the groove 102c. Also, when the drawing operation is carried out, the laser light 1c is irradiated onto the drawing layer 106c where the focal point of this laser light 1c is focused, and thus, a region irradiated by the laser light 1c is discolored. Such an image which can be visually recognized by a user by this discolored region and another region which is not discolored. It should also be noted that FIG. 1 indicates such a case of irradiating the laser light 1c focused onto the drawing layer 106a.

(1-2) Entire Arrangement of System

Figure 2:
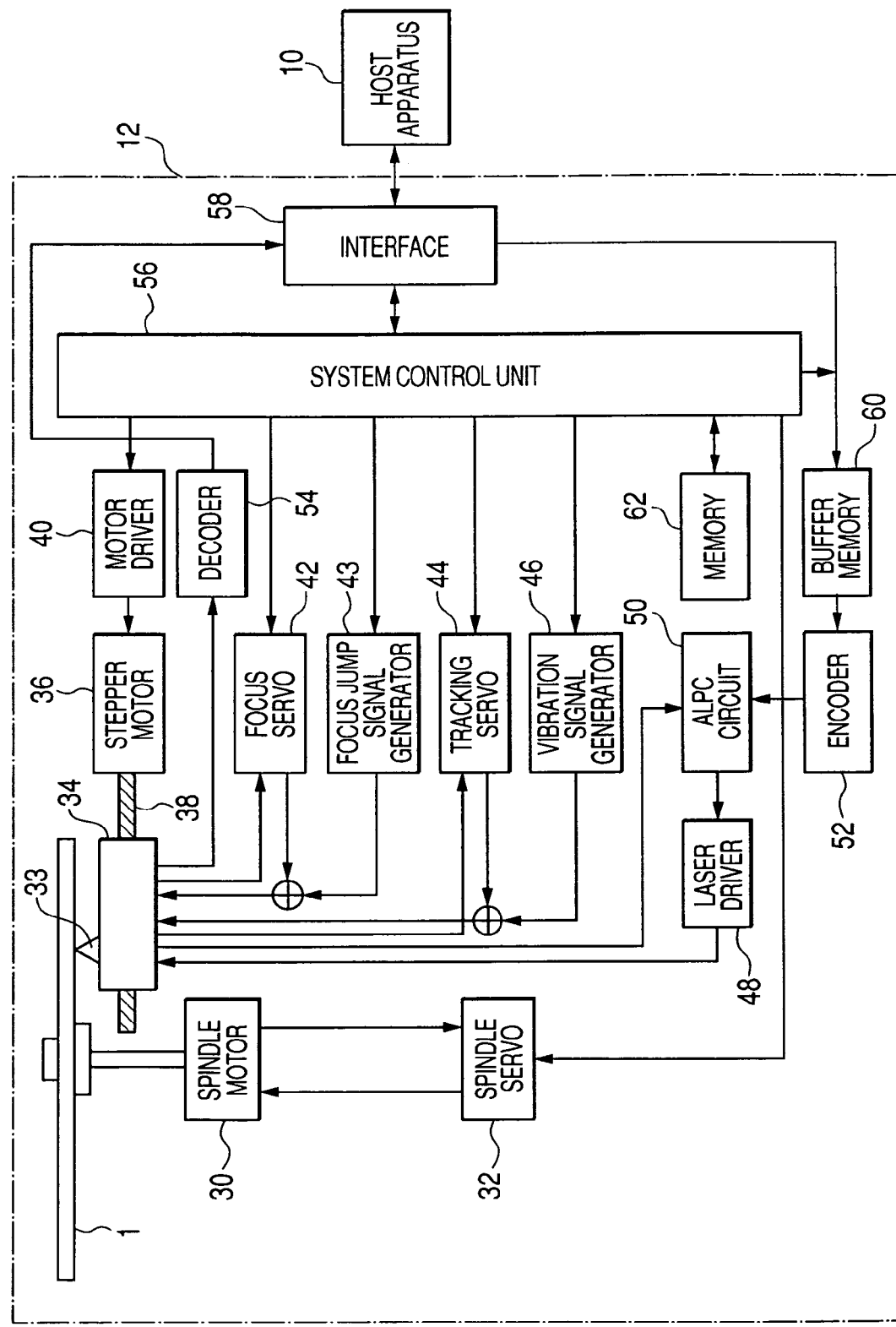
FIG. 2 is a diagram for representing an arrangement of an entire system related to the embodiment.

As represented in FIG. 2, a system, related to the present embodiment, is arranged by connecting a host apparatus 10 with the optical disk recording apparatus 12 under such a condition that the host apparatus 10 is communicable with the optical disk recording apparatus 12. The optical disk recording apparatus 12 may be built in the host apparatus 10, or may be alternatively provided outside the host apparatus 10. Although any one of the above-described optical disks, namely, DVD-R 1a, CD-R 1b, CD-R/DVD-R 1c may be mounted on the optical disk recording apparatus 12, the following descriptions will be made in the case that, for instance, the CD-R 1b is mounted as an "optical disk 1."

In the optical disk recording apparatus 12, the optical disk 1 is rotated by a spindle motor 30. A spindle servo 32 controls rotations of the spindle motor 30 in such a manner that a linear velocity is made constant (namely, CLV control) when both a recording operation and a reproducing operation are carried out, whereas a rotation number thereof is made constant (namely, CAV control) when a drawing operation is carried out. An optical pickup 34 (optical head) is transported by a feeding mechanism 38 in a radial direction (right and left directions, as viewed in this drawing) of the optical disk 1. The feeding mechanism 38 is constructed of a feeding screw and the like, which is driven by a stepper motor 36. A motor driver 40 drives the stepper motor 36 in response to an instruction of a system control unit 56.

Figure 3:
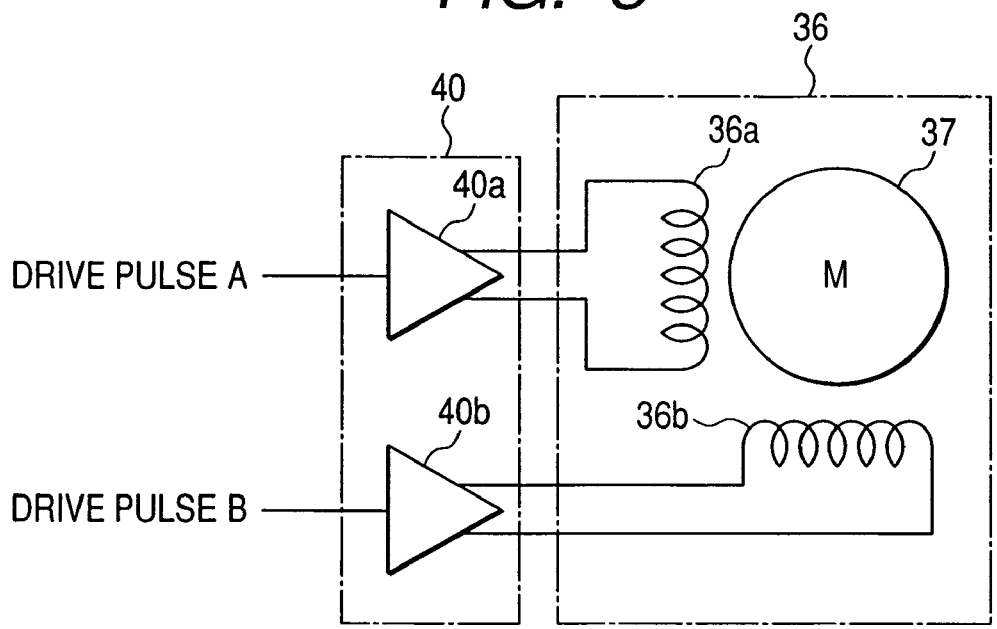
FIG. 3 is a schematic diagram for showing a structural example of a stepper motor.

The stepper motor 36 is arranged by, for example, a 2-phase stepper motor having such a type shown in FIG. 3.

Figure 4:
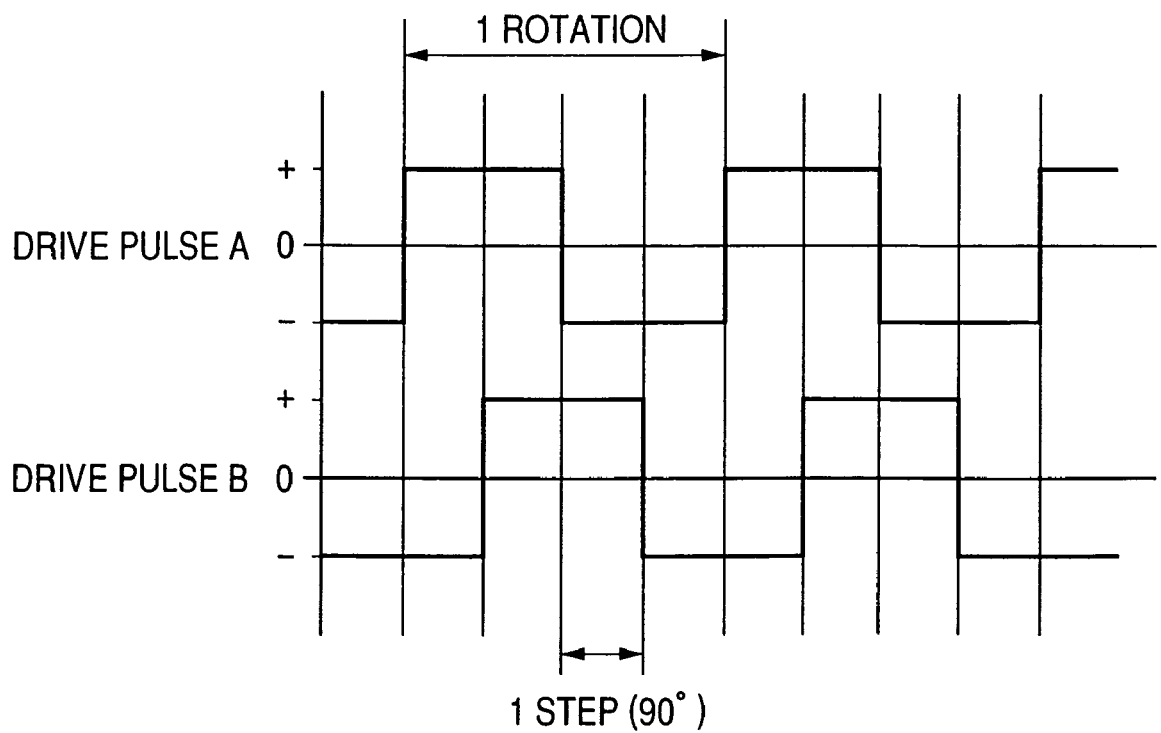
FIG. 4 is a voltage waveform diagram of drive pulses in the case that the stepper motor is driven in a full step drive mode.

The 2-phase stepper motor 36 is equipped with 2 coils 36a and 36b, and is driven in a bipolar manner by receiving 2 phases of drive pulses which are applied to the respective coils 36a and 36b from respective drivers 40a and 40b which constitute a motor driver 40. FIG. 4 shows voltage waveforms of drive pulses "A" and "B" which are applied to the respective coils 36a and 36b in the case that this 2-phase stepper motor 36 is driven in a full step mode. These drive pulses A and B are the following rectangular waveform signals: That is, a duty ratio of each of these rectangular waveform signals is 50%; polarities thereof are alternately switched; and phases of these rectangular waveform signals are shifted by 90 degrees from each other. Since the drive pulses "A" and "B" are used, a rotor 37 is rotated by 90 degrees per 1 step. Since a microstep driving system is employed as the driving system for the stepper motor 36, a rotation angle per 1 step may be decreased. FIG. 5 shows an example of voltage waveforms of drive pulses "A" and "B" which are applied to the respective coils 36a and 36b in the case that this 2-phase stepper motor 36 is driven in the microstep mode. FIG. 5 indicate such voltage waveforms in the case that a dividing number per 1 full step is selected to be "5." Since these drive pulses "A" and "B" are used, the rotor 37 is rotated every a move amount (=18 degrees) of 1/5 with respect to 1 step when the stepper motor 36 is driven in the full step mode.

Referring again back to FIG. 2, a focus servo 42 performs focus control operations of the optical pickup 34 when a data recording operation, a data reproducing operation, and a drawing operation are carried out. A focus jump signal generator 43 produces a control signal for instructing that a focal point of laser light is focused onto the data recording layer 103b of the optical disk 1 when both the data recording operation and the data reproducing operation are carried out, and on the other band, produces another control signal for instructing that the focal point of the laser light is focused on the drawing layer 106b of the optical disk 1 when the drawing operation is carried out. A tracking servo 44 performs a tracking servo control of the optical pickup 34 when the data recording operation and the data reproducing operation are carried out. It should be noted that the tracking servo control is turned off when the drawing operation is carried out. A laser driver 48 drives a laser diode (not shown) of the optical pickup 34 when the data recording operation, the data reproducing operation and the drawing operation are carried out. An ALPC (Automatic Laser Power Control) circuit 50 controls laser power to respective instructed values when the data recording operation, the data reproducing operation, and the drawing operation are carried out.

A vibration signal generator 46 generates a vibration signal when the drawing operation is performed, and supplies this generated vibration signal to a tracking actuator (not shown) of the optical pickup 34 so as to vibrate an objective lens 33. As a result, the laser light is vibrated in a radial direction of the optical disk 1 with a larger amplitude than a unit feeding amount of the optical pickup 34 in the 1 microstep operation. Since this vibrating operation is carried out, the laser light can scan the drawing layer 106b while the laser light is wobbled with the wider width than the unit feeding amount of the optical pickup 34. Although a detailed description will be made later, when the drawing operation is carried out, the optical disk recording apparatus 12 may cause the optical pickup 34 to perform the above-explained vibrating operation while the optical pickup 34 is kept at the substantially same position in the radial direction, and furthermore, may overwrite the same image while the optical disk 1 is rotated plural times. A total number of the above-described overwriting operations will be referred to as "Nw" in the following descriptions.

Both a drawing condition (preset drawing condition) which is set in the optical disk recording apparatus 12 in advance and another drawing condition which can be set by an operator are stored in a memory 62. As this "preset drawing condition", "a feeding amount N of the optical pickup 34 by a 1-full step operation of the stepper motor 36", and "a dividing number (M) of the microstep operation of the stepper motor 36" are stored in the memory 62, while the above-mentioned feeding amount "N" of the optical pickup 34 is employed in order to calculate a unit feeding amount for feeding the optical pickup 34 in the radial direction of the optical disk 1. Also, as the latter-mentioned "drawing condition which can be set by the operator", plural sorts of information as to "drawing modes", and the above-described "overwriting number Nw" are stored in the memory 62, while the information as to the "drawing modes" is a combination of "rotation speeds of optical disks" and "encoding speeds of image data by the encoder 52."

When the data recording operation is performed, the encoder 52 encodes recording data to produce a format in correspondence with the type of optical disk 1 (in this case CD-R 1b). A laser driver 48 modulates the laser light in response to the encoded recording data in order to record the modulated recording data on the data recording layer 103b of the optical disk 1 as a pit. On the other hand, when the drawing operation is carried out, the encoder 52 produces a pulse signal (drawing signal) whose duty ratio is changed in response to gradation data of a pixel which constructs the image data. The laser driver 48 modulates the laser light in response to the pulse signal whose duty ratio is changed, and changes a visual light characteristic of the drawing layer 106b of the optical disk 1 (namely, discolors drawing layer 108b) so as to perform the drawing operation based upon monochromatic multi-gradation. A decoder 54 EFM-demodulates such a light reception signal in response to return light which is received by the optical pickup 34 when the data reproducing operation is performed, so that the decoder 54 executes a data reproducing operation.

The host apparatus 10 transmits such an instruction issued by the operator to the optical disk recording apparatus 12 when the data recording operation, the data reproducing operation, and the drawing operation are carried out. This instruction is transmitted via an interface 58 to the system control unit 56. The system control unit 56 executes corresponding operations with respect to the respective circuits of the optical disk recording apparatus 12 in response to a transmitted instruction. For instance, when the data recording operation is carried out, the host apparatus 10 transmits recording data to the optical disk recording apparatus 12. The transmitted recording data is received by the interface 58 of the optical disk recording apparatus 12, and then, is written in an FIFO type buffer memory 60 by the system control unit 56. Then, the system control unit 56 reads the recording data from the buffer memory 60 and supplies the read recording data to the encoder 52. The encoder 52 performs the above-described encoding process operation with respect to the supplied recording data, and supplies the encoded recording data to the laser driver 48. Also, when the data reproducing operation is carried out, data reproduced by the decoder 54 is transferred via the interface 58 to the host apparatus 10. On the other hand, when the drawing operation is carried out, the host apparatus 10 transmits image data to the optical disk recording apparatus 12. This transmitted image data is received by the interface 58, and is written in the buffer memory 60 by the system control unit 56. Then, the system control unit 56 reads the image data from the buffer memory 60 and supplies the read image data to the encoder 52. The encoder 52 performs the above-described encoding process operation with respect to the supplied image data to produce a pulse signal (drawing signal), and then supplies the encoded image data to the laser driver 48.

(1-3) Overwriting of Image

Next, a description is made of the above-described overwriting operation of the image.

FIGS. 6A and 6B are plan views for showing loci of laser light which is irradiated on the drawing layer 106b. FIG. 6A indicates a locus of the laser light in the case that a total number of overwriting operations is "2", and FIG. 6B indicates a locus of the laser light in the case that a total number of overwriting operations is "5". As represented in the drawing, the overwriting operations are carried out in such a manner that the loci of the laser light for each rotation are not overlapped with each other on the substantially same circumferences. As a consequence, the image can be drawn with a small gap, and very fine variable density representations can be obtained.

A power value (for example, Nw=3) as the overwriting number "Nw" is stored in the memory 62 by considering these items. While the system control unit 56 maintains the irradiation position (namely, position of optical pickup 34 in the radial direction) of the laser light within a range of a certain constant amplitude, the system control unit 56 rotates the spindle by plural turns which are equal to the overwriting number "Nw". Then, the system control unit 56 repeatedly performs the following process operation. That is, when the rotations of the spindle by the overwriting number "Nw" are accomplished, the system control unit 56 moves the irradiation position of the laser light to the outer circumferential direction by a predetermined distance, and rotates the spindle by the overwriting number "Nw", while the irradiation position of the laser light is again kept within the above-explained range of the amplitude.

As the image data which is overwritten on each other at this time, all of data having the same contents may be sufficiently employed. To this end, if the system control unit 56 writes the image data received from the host apparatus 10 in a first storage region of the buffer memory 60, then the system control unit 56 produces (overwriting number "Nw"−1) pieces of duplication data as to the received image data, and writes these duplication data in a second storage region of the buffer memory 60. As a result, a plurality of data having "Nw" pieces of the same contents can be prepared in the buffer memory 60 by combining the image data with the duplication data. Thereafter, the system control unit 56 reads out the image data from the buffer memory 60 and irradiates the laser light in response to the read image data. During this process operation, the optical disk 1 is rotated by 1 turn. Next, the system control unit 56 reads out 1 piece of the duplication data from the buffer memory 60, and irradiates the laser light in response to the read duplication data while the optical disk 1 is rotated by 1 turn. Since the system control unit 56 repeatedly performs this process operation by plural times which are equal to the total quantity of these duplication data, the overwriting operation is repeatedly performed based upon the same data.

(1-4) Structure of Buffer Memory 60

Next, a description is made of a structure of the buffer memory 60.

Even when any one of the data recording operation and the data reproducing operation is carried out with respect to the optical disk 1, if the data is read and/or written by employing the commonly used buffer memory 60, then the optical disk recording apparatus 12 can be simply developed, and also, the hardware thereof can be commonly used. It should also be noted that when the drawing operation is carried out with respect to the optical disk 1, there is such a feature that the above-described duplicating process operation of the image data is carried out.

In this example, for example, in the format of a CD-R/RW, one group of data will be referred to as a "sector", and this sector is defined as 1 unit of data reading/writing operation. 98 pieces of "EFM frames" and 1 piece of "sub-code frame" are contained in 1 sector. Furthermore, 24-byte main data is contained in each of the EFM frames, whereas 96-byte sub-code data is contained in the sub-code frame. As a consequence, a total byte number of 1 sector becomes 98 [pieces]× 24 [bytes]+1 [piece]×96 [bytes]=2448 [bytes] (in case of RAW mode where data is not processed).

When data is transferred from the host apparatus 10 to the optical disk recording apparatus 12, the WRITE command defined in the ATAPI (AT Attachment Packet Interface) is employed. The WRITE command implies such a command for instructing that data transferred from the host apparatus 10 is written in the buffer memory 60, while information such as a data size of image data to be transferred is contained in this WRITE command. In a data transfer operation, such a method is employed by which date groups in several "sector" units are collected, and the collected data groups are transferred in response to a single WRITE command. Then, with respect to rotations of an optical disk and data transferred from the host apparatus 10, the system is arranged in such a manner that the following formula can be established:

$$Sr = Su \times Nt \quad (a)$$

Note:

Sr: number of sectors which are recorded while optical disk 1 is rotated by 1 turn, Su: number of sectors which are transferred from host apparatus 10 by 1 WRITE command, and Nt: number of WRITE commands which are employed in data transfer operation from host apparatus 10 while optical disk 1 is rotated by 1 turn.

In the above-described equation (a), the total number "Nt" of WRITE commands while the optical disk 1 is rotated by 1 turn must be selected to be an integer. To this end, the optical disk recording apparatus 12 is required to design, in advance, an encode frequency (encode speed of CD) and a rotation speed of the spindle motor 30 per unit time to become proper values respectively. For instance, assuming now that Sr (recording sector number) is selected to be "90", Su (transferring sector number) is selected to be "15", and Nt (WRITE command number) is selected to be "6", the encode speed becomes 45-times speed of CD and the rotation speed of the spindle motor 30 is 2250 [rpm] (rotations per minute). This reason will be described as follows:

In the case that the optical disk 1 is a CD-R, the encoder 52 encodes a certain amount of data by 1 second at the standard speed (1-time speed), while this data amount is equivalent to 75 sectors. An encoding process amount per unit time which is obtained by converting the sectors into the byte number becomes 75×2448=183600 [bytes/second]. When this encoding process amount is converted into such a case that the encode speed corresponds to the 45-times speed of CD, the converted encoding double amount becomes 45×183600=826200 [bytes/second].

As described above, in this case, Su (transfer sector number)=15, and Nt (WRITE command number)=6. As a consequence, if data equivalent to 15 sectors are transferred from the host apparatus 10 to the optical disk recording apparatus 12, then this transferred data amount becomes equivalent to a data amount required while the optical disk 1 is rotated by 1 turn. In other words, a total byte number of such data which can be stored when the optical disk 1 is rotated by 1 turn becomes 2448×Su×Nt=2448×15×6=220320 [bytes/turn]. Then, if the above-described encoding process amount per unit time is divided by the data amount obtained. When this optical disk 1 is rotated by 1 turn, then a rotation speed of the spindle motor 30 per unit time, namely, the rotation speed becomes 8262000/220320=37.5 [turns/second]. When this rotation speed is converted into a rotation speed per minute, it becomes 37.5×60=2250 [rpm]. As previously explained, if the data group equivalent to 15 sectors is transferred 6 times to the optical disk recording apparatus 12 while the optical disk 1 is rotated by 1 turn, then the following fact can be revealed: That is, for example, the encode frequency is equal to CD 45-times speed, and the rotation speed of the spindle motor 30 is 2250 [rpm]. A designer for the optical disk recording apparatus 12 must design the optical disk recording apparatus 12 which is capable of realizing a combination between such an encode frequency and such a rotation speed of a spindle motor.

Based upon the above-described facts, a description is made of a basic operation when data is read and/or written with respect to the buffer memory 60.

As schematically illustrated in FIGS. 7A to 7F, the buffer memory 60 employs such a ring buffer form that 36 pieces of storage regions "m" are arranged in a ring shape. Numerals applied to the respective storage regions "m" imply region numbers which are allocated to the respective regions for the sake of convenience. A storage capacity of each of these storage regions "m" is equivalent to 15 sectors. As a consequence, an entire storage capacity of the buffer memory 60 becomes 36 [pieces]×15 [sectors]×2448 [bytes]=132190 [bytes].

It should also be noted that arrows indicated as "READ" and "WRITE" represent pointers. For instance, an arrow "READ" is a READ pointer, and points out such a storage region "m" into which data to be read from the buffer memory 60 is stored. On the other hand, an arrow "WRITE" is a WRITE pointer, and points out such a storage region "m" into which data should be written with respect to the buffer memory 60. It should also be noted that symbol "NULL" implies such a region which is indicated by a pointer for the sake of convenience in the case that the pointer does not indicate any of these storage regions "m" of the buffer memory 60.

Figure 7A:
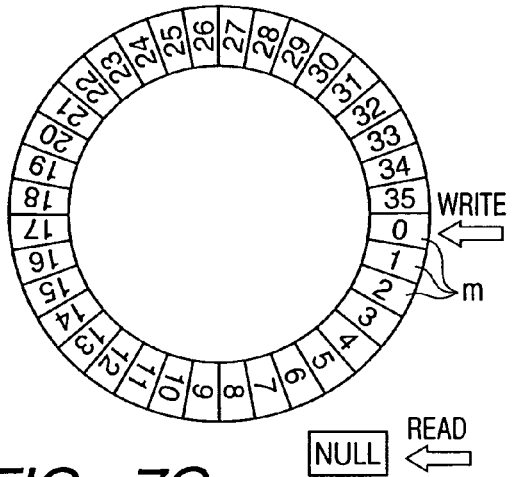
FIGS. 7A to 7F are diagrams for explaining data reading/writing operations with respect to a buffer memory.
Figure 7B:
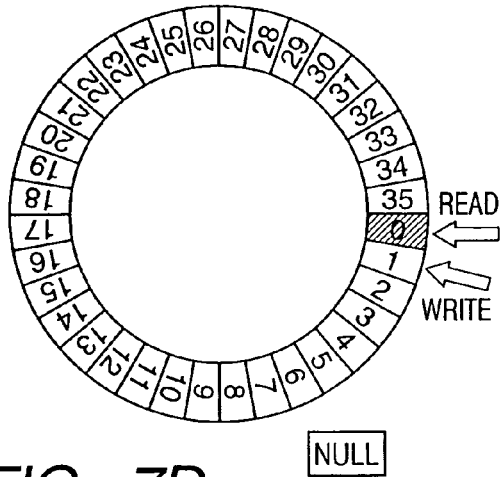
Figure 7C:
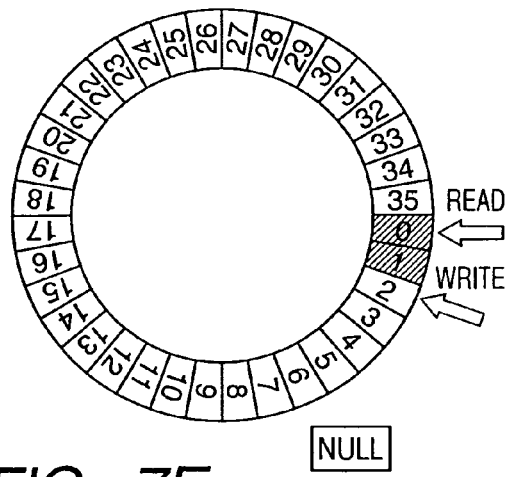

FIG. 7A indicates a condition of the buffer memory 60 before a buffering operation is commenced. As shown in the drawing, although the WRITE pointer points out a storage region "m" having a region number "0", into which data should be firstly stored, since there is no data to be read from the buffer memory 60, the READ pointer points out "NULL". Next, FIG. 7B shows such a condition that data transferred from the host apparatus 10 by 1 transfer time is written in the buffer memory 60. It should also be understood that a storage region "m" indicated by a hatched line implies that data is stored in this storage region "m". At this time, the WRITE pointer is advanced to one succeeding storage region from the region number "0" into which the data is stored, and thus, points out a storage region "m" having a region number "1". Also, the READ pointer points out a storage region "m" having a region number "0" from which data should be firstly read. FIG. 7C shows such a condition that data are transferred from the host apparatus 10 two transfer times. The WRITE pointer is advanced to one succeeding storage region from the storage regions "m" having the region numbers "0" and "1" into which the data are stored, and thus, points out another storage region "m" having a region number "2".

In this example, in order to easily describe the data reading operation, the READ pointer has still pointed out the storage region "m" of the region number "0."

Figure 7D:
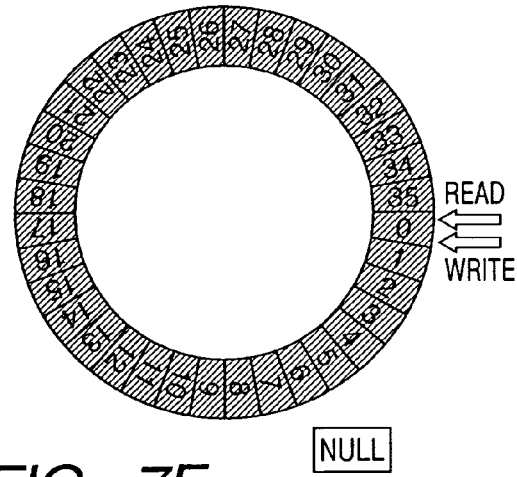

While the system control unit 56 moves the WRITE pointer, the system control unit 56 sequentially writes the data transferred from the host apparatus 10 into the buffer memory 60 in the above-described manner. FIG. 7D represents such a condition that the above-described data writing process operation is repeatedly carried out, so that the data are written in all of the storage regions "m" of the buffer memory 60. As described above, such a condition that the READ pointer and the WRITE pointer point out the same storage region "m" implies that a storage region into which data should be written is not empty. Accordingly, under this condition, data cannot be furthermore stored in the buffer memory 60. As a consequence, when a request for transferring data in combination with the WRITE command is transmitted from the host apparatus 10 under this condition, the optical disk recording apparatus 12 returns this request as an error and thus does not receive the data.

Next, a description is made of data reading operation.

Figure 7E:
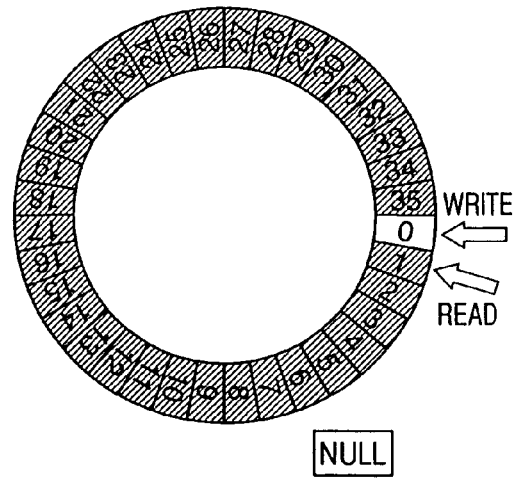

When a data reading operation is commenced from such a condition shown in FIG. 7D, the system control unit 56 firstly reads out the data from the storage region "m" having the region number "0" pointed out by the READ pointer, and then, supplies the read data to the encoder 52. At the same time, the system control unit 56 moves the READ pointer to a next storage region "m" having a region number "1". As a result, the storage condition of the buffer memory 60 becomes such a condition as shown in FIG. 7E. As described above, the system control unit 56 repeatedly performs such an operation that the system control unit 56 sequentially reads data from the buffer memory 60 while moving the READ pointer and sequentially supplies the read data to the encoder 52. As a result, the storage condition of the buffer memory 60 is returned to the storage condition of FIG. 7A. Under the storage condition of FIG. 7A, the buffer memory 60 becomes a buffer empty where there is no data which should be read, so that the system control unit 56 constitutes such a condition that the READ pointer again points out "NULL."

Figure 7F:
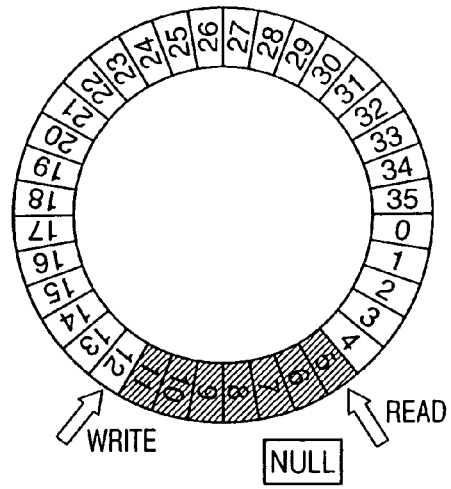

In the above explanation, the data writing operation and the data reading operation are separately described. However, in an actual case, when a certain amount of data are buffered in the buffer memory 60, a data reading operation is commenced in accordance with the READ pointer. As a consequence, as shown in FIG. 7F, a data writing operation and a data reading operation are carried out simultaneously on the buffer memory 60.

In this case, as one example, such a case is considered in which a data is transferred from the host apparatus 10 in the ULTRA DMA transfer Mode 0 defined in the ATAPI. It is so assumed that the encode frequency in the optical disk recording apparatus 12 is selected to be 45-times speed of the CD. As described above, the encoding process operation in this case is carried out at a pace of 8362000 [bytes/second]. The storage capacity of each of the storage regions "m" shown in FIG. 7A is equal to 15×2448=36720 bytes. As a result, every time 36720/836200=4.4 [milliseconds] pass, the READ pointer is moved to the next storage region "m."

On the other hand, a data transfer speed from the host apparatus 10 is nearly equal to 17406362 [bytes/second] in maximum in accordance with the definition of the ULTRA DMA transfer Mode 0 of the ATAPI. In this case, every time 36720/17406362=2.1 [milliseconds] have elapsed, the WRITE pointer is moved to the next storage region "m." As previously explained, the move interval of the READ pointer is 4.4 [milliseconds], whereas the move interval of the WRITE pointer is 2.1 [milliseconds], which implies that the move speed of the READ pointer is faster than the move speed of the WRITE pointer, so that data is not accumulated in the buffer memory 60. However, this condition can be realized in such a case that the maximum data transfer speed by the host apparatus 10 is achieved. In an actual case, there are many possibilities that the actual data transfer speed may become slower than this maximum data transfer speed due to such a factor as performance of the host apparatus 10. Furthermore, there are some possibilities that the transfer speed is varied due to adverse influences caused by various conditions while data are transferred. In a specific case, there are some possibilities that data transfer operations are instantaneously stopped. Under such a circumstance, while the move speed of the WRITE pointer and the move speed of the READ pointer are dynamically varied in dynamic manners, the data writing operation and the data reading operation are carried out with respect to the buffer memory 60.

It is preferable that a storage capacity of a storage region "m" of the buffer memory 60 is caused to be related to the drawing operation mode. For example, in such a case that a drawing operation is carried out under the above-described condition (Su=15 and Nt=6), it is preferable to set the storage capacity of each of the storage regions "m" in the buffer memory 60 to 15 sectors, namely equal to the sector number "Su". If such a relationship is established, since the WRITE command number "Nt" is equal to 6, when the data is buffered based upon one WRITE command, then the WRITE pointer is moved over just 6 pieces of the storage regions "m". In this case, a data amount equivalent to 1 turn of the optical disk 1 is Sr=90, and corresponds to 6 pieces of the storage regions "m" of the buffer memory 60. Since the buffer memory 60 contains 36 pieces of the storage regions "m", the buffer memory 60 can store data required while the optical disk 1 is rotated by 6 turns. If the storage capacity of the buffer memory 60 is increased, then the buffer memory 60 can store such data required while the optical disk 1 is rotated by larger turns than 6 turns.

(1-5) Arrangement of Encoder 52

Next, referring to FIG. 8, the arrangement of the encoder 52 will now be described in detail.

Figure 8:
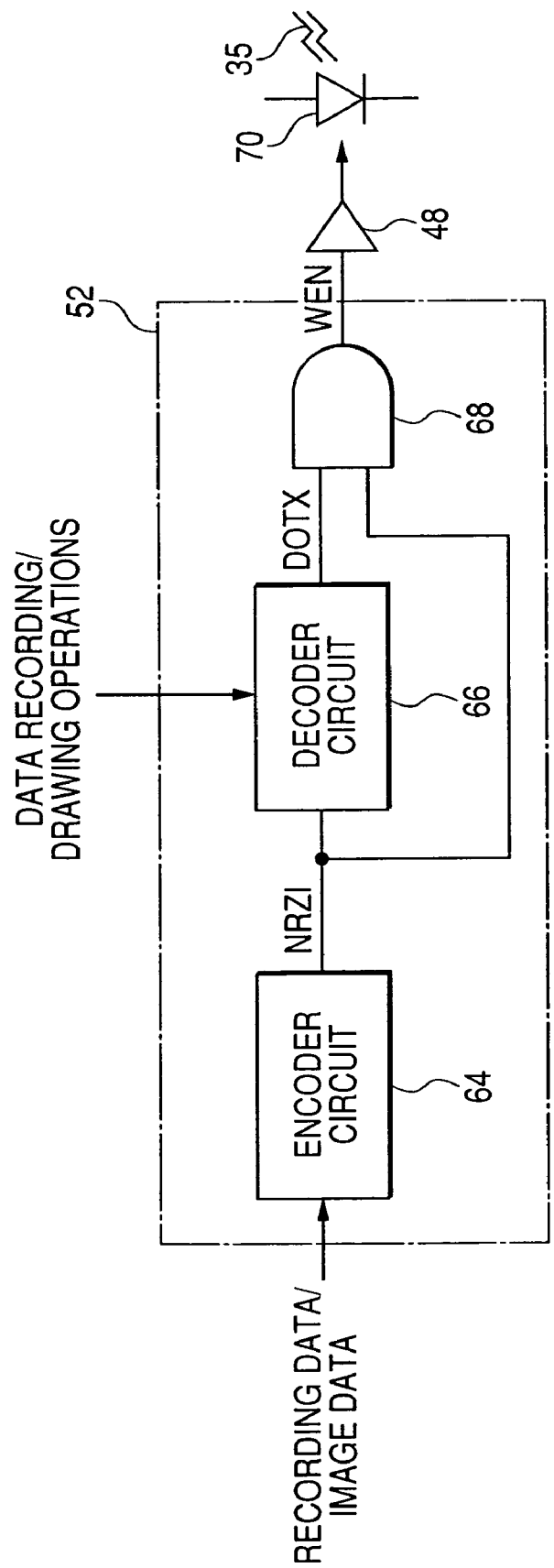
FIG. 8 is a block diagram for showing a structure of an encoder.

In FIG. 8, an encoder circuit 64 inputs recording data when a data recording operation is carried out, and inputs image data when a drawing operation is carried out. The encoder circuit 64 performs an interleaving process operation with respect to the recording data, and thereafter, performs an EFM modulation, and furthermore, executes a synchronizing process operation, an adding process operation of parity data and a margin bit, and an NRZI (NonReturn to Zero invert) inverting process operation with respect to the interleave-processed recording data so as to continuously produce recording signals which constitute 1 EFM frame. The recording signals produced in the encoder circuit 64 directly pass through an AND gate 68 and are supplied to the laser driver 48. The laser driver 48 drives a laser diode 70 in response to the supplied recording signals so as to modulate power of the laser light to obtain a binary value, and records the recording signals on the data recording layer 103*b* of the optical disk 1 as pits. In other words, the laser driver 48 increases the laser power to such a level at which the pit is formed within a section where the recording signal has an "H" level, and decreases the laser power to such a level at which the pit is not formed within a section where the recording signal has an "L" level.

The encoder circuit 64 processes the image data when the drawing operation is carried out in a similar handling manner to that for the recording data when the data recording operation is carried out. It should also be noted that the interleaving process operation may not be alternatively carried out. When the interleaving process operation is not performed, while the encoder circuit 64 does not execute the interleaving process operation with respect to the image data, the encoder circuit 64 directly performs an EFM modulation, and furthermore, executes a synchronizing process operation, an adding process operation of parity data and a margin bit, and an NRZI inverting process operation with respect to the image data in order to continuously produce recording signals which constitute 1 EFM frame. In this case, image data for 1 pixel (namely, gradation data indicative of gradation of this 1 pixel) is contained in the data for 1 EFM frame. In the present embodiment, the data of 1 pixel is expressed by a length of 1 EFM frame.

A decoder circuit 66 is switched during data recording operation and drawing operation. Firstly, when the data recording operation is carried out, the decoder circuit 66 continuously outputs a signal having an "H" level. This signal having the "H" level is entered to one input terminal of the AND gate 68. As a consequence, the output signal of the encoder circuit 64, namely the recording signal which is entered to the other input terminal of the AND gate 68 during the data recording operation, directly passes through the AND gate 68. On the other hand, when the drawing operation is carried out, the decoder circuit 66 EFM-demodulates data output from the encoder circuit 64 so as to acquire gradation data of 1 pixel per 1 EFM frame every 1 pixel. Then, the decoder circuit 66 outputs a pulse signal "DOTX", the time period of which is equal to 1 EFM frame length, and the duty ratio of which is changed in response to the acquired gradation data for each pixel. The pulse signal DOTX is entered to one input terminal of the AND gate 68. As a consequence, when the drawing operation is carried out, the AND gate 68 opens its gate only for a time duration responding to the gradation value of the corresponding pixel every 1 EFM frame period in order to pass therethrough the output signal (namely, NRZI-converted EFM signal) which is entered to the other input terminal. Although a fragmentary signal "WEN" (drawing signal for drawing one pixel) of the NRZI signal output from the AND gate 68 has no longer a complete implication by the own fragmentary data, this fragmentary signal WEN corresponds to the NRZI signal, and therefore a duty ratio of this fragmentary signal WEN is approximately 50%. As a consequence, a duty ratio of an NRZI fragmentary signal WEN with respect to the 1 EFM frame length, which penetrates through the AND gate 68 during 1 EFM frame period corresponding to 1 pixel, may correspond to the duty ratio of the pulse signal DOTX, namely, the gradation value of the corresponding pixel. The above-described duty ratio of the NRZI fragmentary signal WEN implies such a ratio of a total value as to pulse widths of the NRZI fragmentary signals WEN which penetrate through the AND gate 68 for this time period with respect to the 1 EFM frame length.

When the drawing operation is carried out, the NRZI fragmentary signal WEN output from the AND gate 68 is supplied to the laser driver 48 as a drawing signal. The laser driver 48 drives the laser diode 70 in response to this drawing signal so as to modulate power of laser light to obtain a binary value, and then irradiates the modulated laser light onto the drawing layer 106b of the optical disk 1. Concretely speaking, the laser driver 48 increases the laser power to the drawing level within a section where the drawing signal WEN has an "H" level, whereas the laser driver 48 decreases the laser power to such a level at which the drawing operation is not performed within a section the drawing signal WEN has an "L" level. In this case, a distance (namely, length in the circumferential direction, which is allocated in order to draw 1 pixel) on the optical disk 1 in the circumferential direction, which corresponds to the 1 EFM frame length, is very short, so that 1 drawn pixel may be observed as 1 point (1 dot) as viewed by human eyes. It may be felt that the higher the duty ratio becomes, the lighter the drawn dot color becomes. Therefore, the gradation can be represented in the image formed on the drawing layer 106b of the optical disk 1 in the above-described manner.

Figure 9:
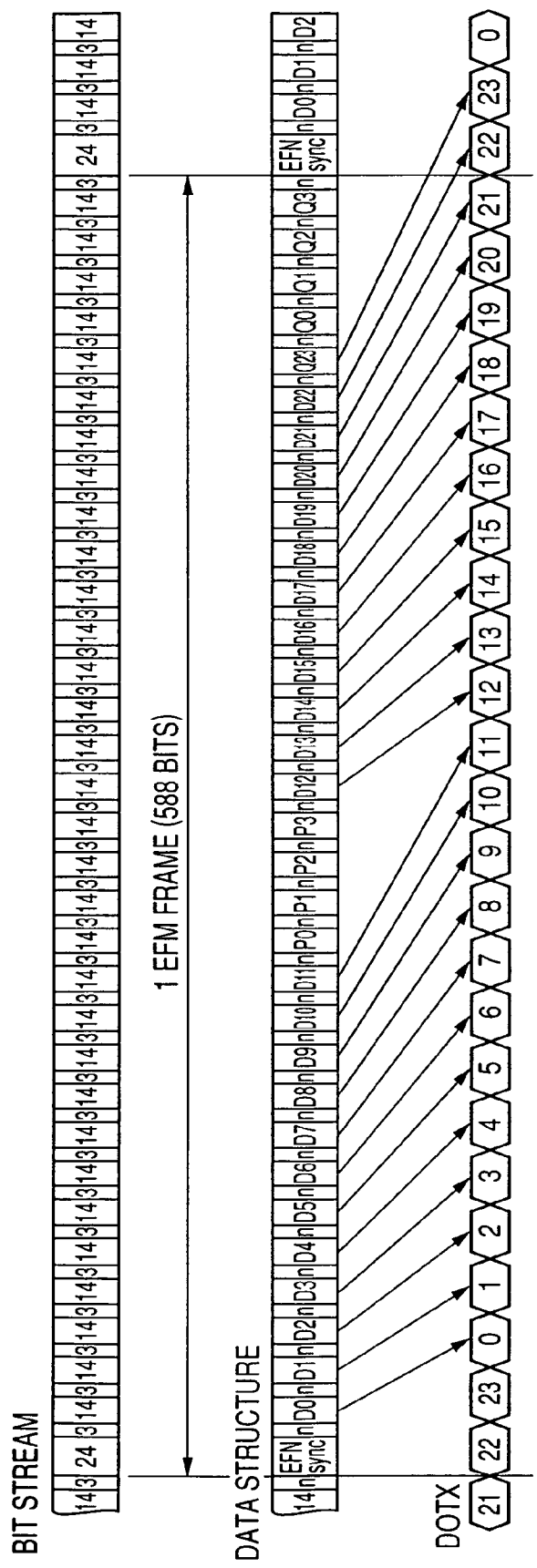
FIG. 9 is a diagram for representing a relationship between a data structure of an EFM frame and a pulse signal DOTX.
Figure 10:
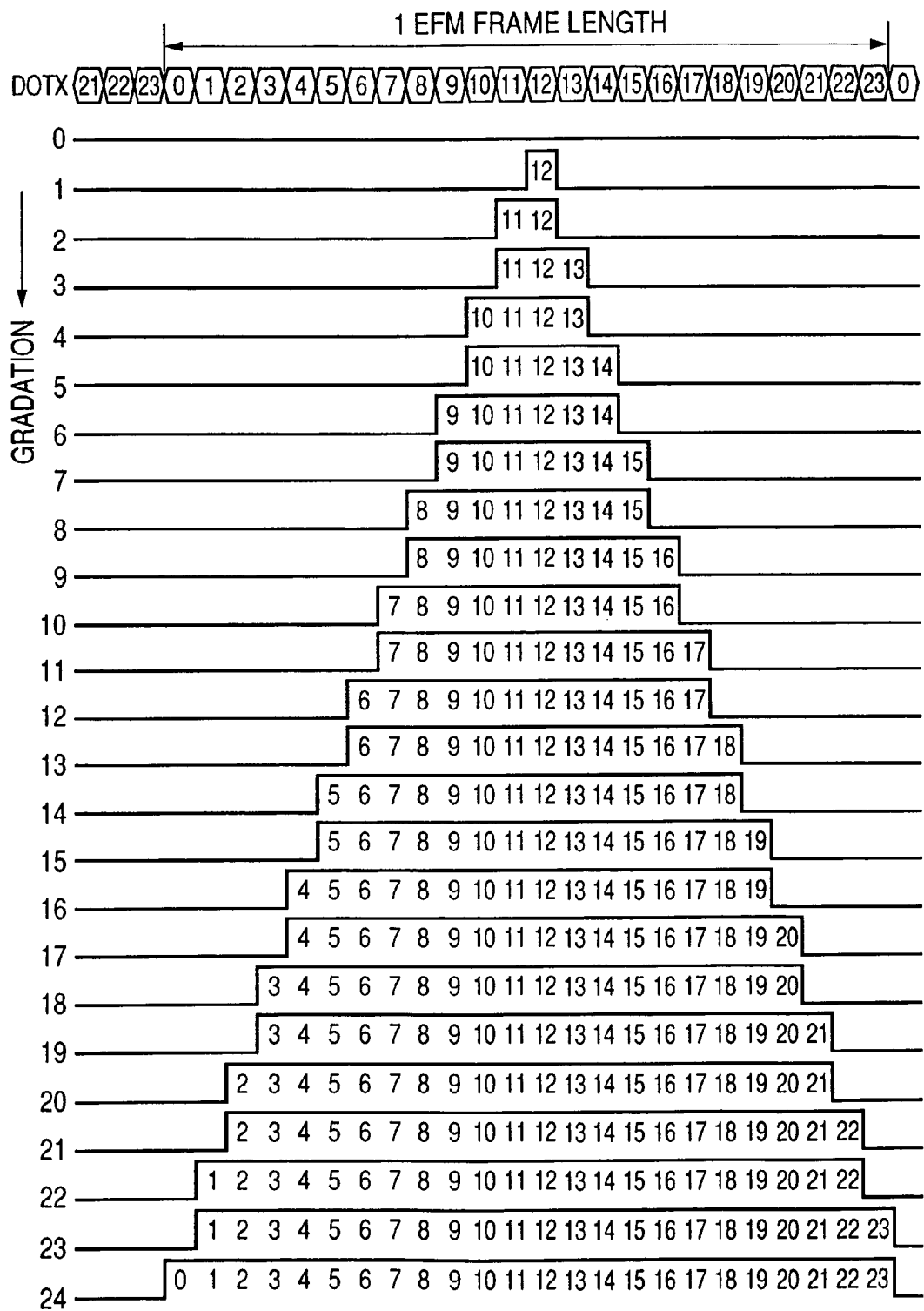
FIG. 10 is a diagram for representing one example of waveforms for each of gradation of the pulse signal DOTX.

Referring now to FIG. 9 and FIG. 10, a description is made of a setting operation as to the duty ratio of pulse signal DOTX output from the decoder circuit 66 when the drawing operation is carried out.

FIG. 9 shows a relationship between the pulse signal DOTX and a data structure of an EFM frame. A "bit stream" of FIG. 9 shows a format of an NRZI signal, and numerals indicated in this drawing show bit numbers. A "data structure" of FIG. 9 indicates the data structure of the EFM format. Symbol "EFM sync" indicates a sync pattern representative of a segment of an EFM frame; symbols "D0" to "D23" show data; symbols "P0" to "P3" indicate P parities; symbols "Q0" to "Q3" represent Q parities; and symbol "n" is a margin bit. It should also be noted that the data structure itself of this EFM frame for the data recording operation is identical to that for the drawing operation. Differences between the data recording operation and the drawing operation are contents of the data "D0" to "D23." That is to say, the data "D0" to "D23" used for the data recording operation are data indicative of information to be recorded, whereas the data "D0" to "D23" used for the drawing operation are data formed in response to gradation of 1 pixel allocated to this 1 EFM frame.

Symbol "DOTX" of FIG. 9 is the pulse signal DOTX. This pulse signal DOTX is such a signal that 1 EFM frame length is equally divided into 24 of sections "0" to "23", and is set to either an "H" level or an "L" level in the unit of this divided section (duty ratio is changed from 0 to 100%). In FIG. 9, as indicated by arrows, the data "D0" to "D23" are defined in correspondence with the sections "0" to "23" of the pulse signal DOTX. Then, in the case that the data "D0" to "D23" are specific codes, the corresponding divided sections of the pulse signal DOTX are set to "H" levels, whereas in the case that the data "D0" to "D23" are codes other than the specific codes, the corresponding divided sections of the pulse signal DOTX are set to "L" levels. In other words, in response to gradation data demodulated by the decoder circuit 66 (FIG. 8) (in this example, data indicative of 25 stages of gradation defined from zeroth gradation to 24th gradation), in the case of the zeroth gradation (no drawing operation), all of the divided sections of the pulse signal DOTX are set to the "L" levels; in the case of the first gradation, only 1 divided section of the pulse signal DOTX is set to the "H" level; in the case of the second gradation, two divided sections of the pulse signals DOTX are set to the "H" levels; - - -, in the case of 24th gradation (highest density), all of the divided sections of the pulse signal DOTX are set to the "H" levels.

Figure 11:
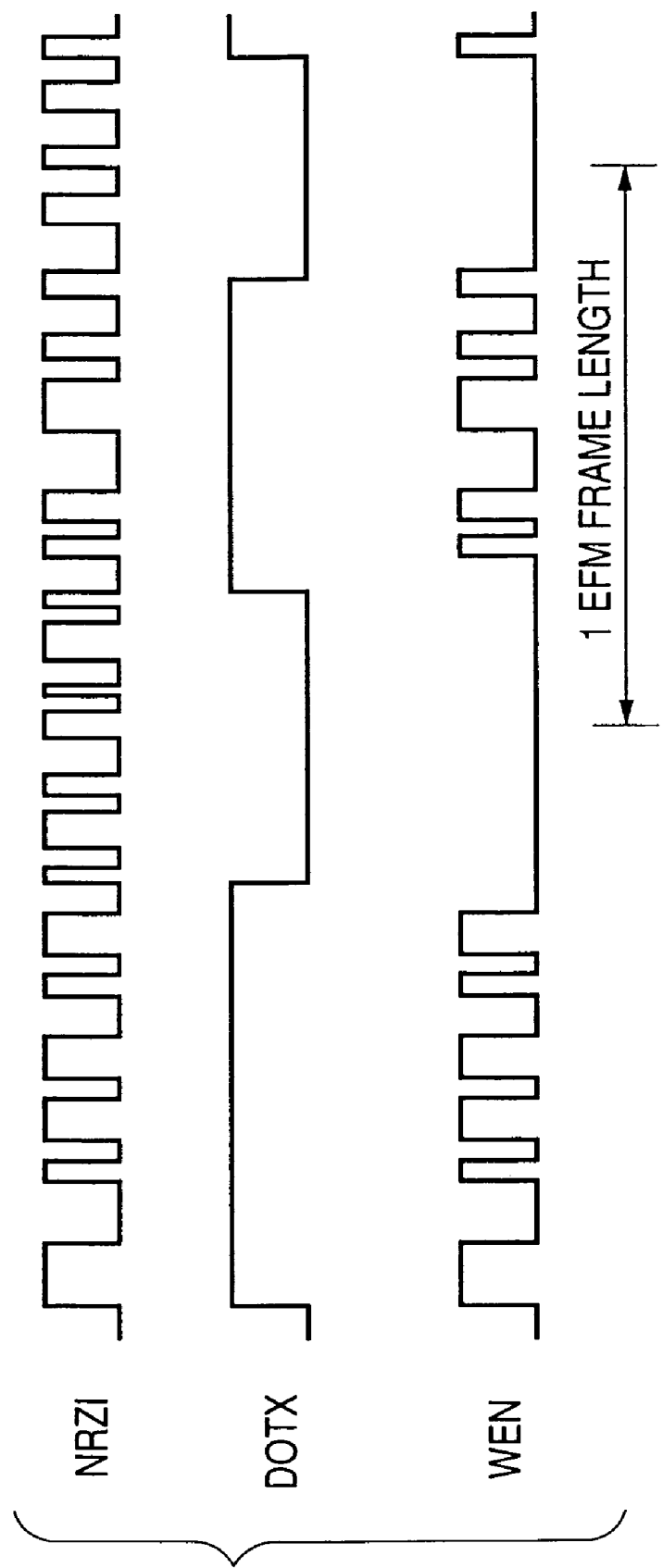
FIG. 11 shows an operating waveform diagram when a drawing operation is performed by the encoder.

FIG. 10 shows one example as to waveforms of pulse signals DOTX with respect to each gradation of the above-described 25 stages from the zeroth gradation to the 24th gradation. In this setting operation of the duty ratios, the "H"-leveled sections of the pulse signals DOTX are sequentially widened from a portion in the vicinity of a center portion in a section of the 1 EFM frame length to forward and backward sides while a gradation number is increased. The decoder circuit 66 sets the respective values of the data "D0" to "D23" in order that the pulse signals DOTX shown in FIG. 10 are produced in response to the demodulated gradation data. In other words, among the data D0 to D23, data corresponding to the divided sections where the pulse signals DOTX are set to the "H" levels are set to the above-described specific codes, whereas data corresponding to the divided sections when the pulse signals DOTX are set to the "L" levels are set to the codes other than the specific codes. Also, FIG. 11 represents operating waveforms of the encoder 52 when the drawing operation is performed. In FIG. 11, an NRZI signal shown in FIG. 11 is switched in the time period of the 1 EFM frame length by such a pulse signal DOTX of FIG. 11 by the AND gate 68, so that an NRZI fragmentary signal WEN shown in FIG. 11 is formed. It should also be understood that for the sake of easy understandings, both the NRZI signal and the WEN signal of FIG. 11 are expressed based upon simple waveforms.

(2) Operations

Next, operations of the above-explained system will now be described.

Figure 12:
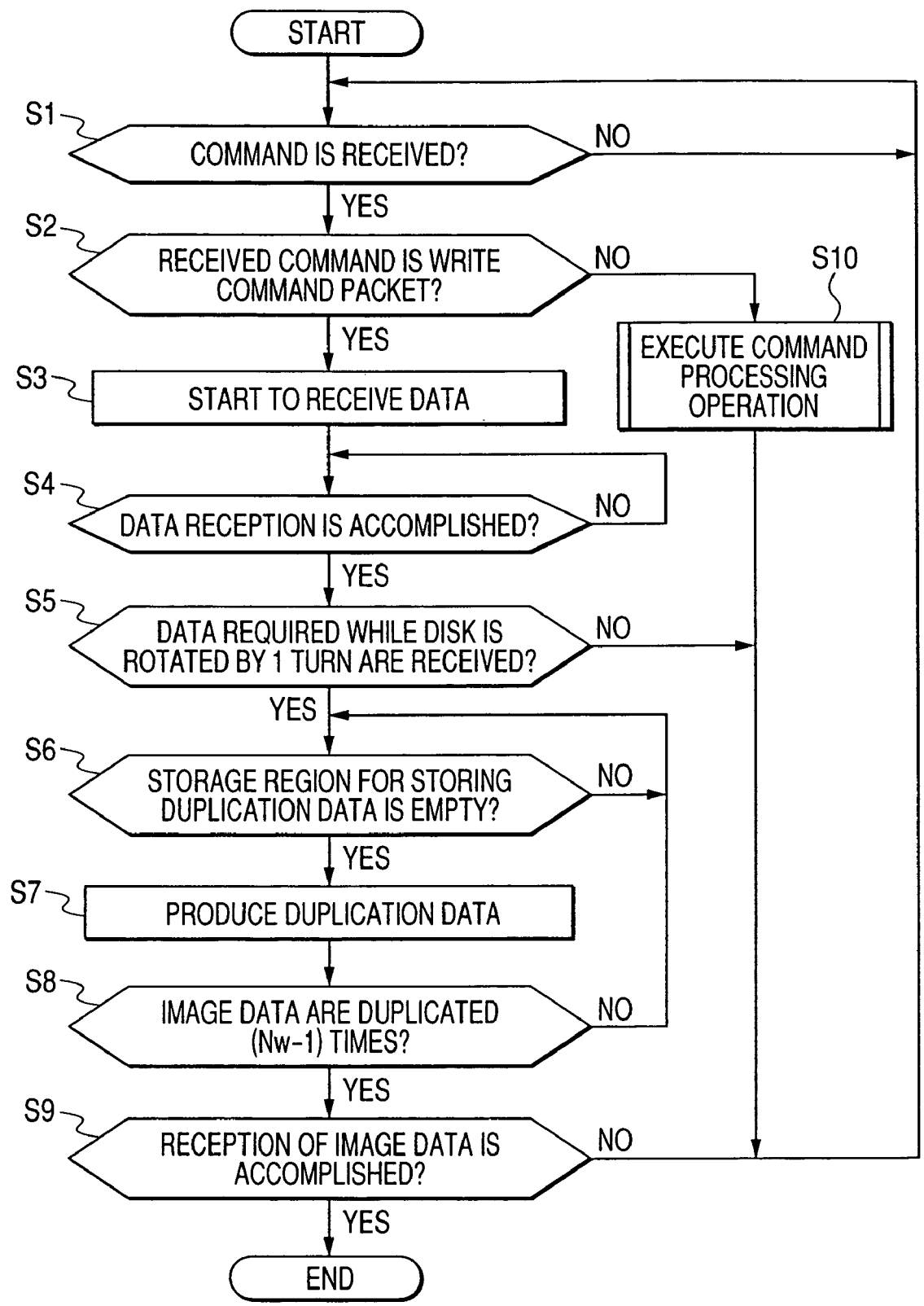
FIG. 12 is a flow chart for describing a process operation executed by a system control unit 56.

FIG. 12 is a flow chart for describing operations of the system control unit 56. With reference to this flow chart, a description is made of the operations of the system control unit 56 in such a case that the sector numbers transferred in response to the WRITE command are Su=15, the number of the WRITE commands employed in the data transferring operation while the optical disk 1 is rotated by 1 turn is Nt=6, and the overwriting number is Nw=3.

When the optical disk 1 is inserted in the optical disk recording apparatus 12, process operations indicated in FIG. 12 are commenced. Firstly, the system control unit 56 judges whether or not a command for instructing a certain process operation is received from the host apparatus 10 (step S1). Upon receipt of the command ("YES" in step S1), the system control unit 56 judges whether or not the received command corresponds to a WRITE command of image data (step S2). If the received command is not the WRITE command of the image data ("NO" in step S2), then the system control unit 56 may merely perform the process operation instructed by this command (step S10). Since this process operation is the same as the conventional system, a detailed explanation thereof is omitted.

To the contrary, when the received command corresponds to the WRITE command of the image data ("YES" in step S2), the system control unit 56 starts to receive image data which is transferred subsequent to this WRITE command, and sequentially writes the received image data into the storage regions "m" of the buffer memory 60 (step S3). Then, when the receiving and writing operations for the image data transferred in response to the 1 WRITE command are accomplished ("YES" in step S4), the system control unit 66 judges whether or not all of the image data equivalent to the data amount required while the optical disk 1 is rotated by 1 turn are received (step S5). When the image data equivalent to the data required while the optical disk 1 is rotated by 1 turn have not yet been received ("NO" in step S5), the process operation of the system control unit 56 is again advanced to the step S1. In this step S1, the system control unit 56 repeatedly performs the above-described process operations defined in the step S1 to the step S5 until the system control unit 56 receives the image data equivalent to the data required while the optical disk 1 is rotated by 1 turn.

To the contrary, if the image data equivalent to the data required while the optical disk 1 is rotated by 1 turn are received ("YES" in step S5), the system control unit 56 judges whether or not such a storage region into which duplication data of the image data written in the buffer memory 60 can be written is empty (step S6). When the writable storage region is empty ("YES" in step S6), the system control unit 56 produces the duplication data as to the image data written in the buffer memory 60, and then, writes the produced duplication data into such a storage region "m" subsequent to the storage region "m" where the image data is stored (step S7). Then, if the necessary number of duplication data are produced ("YES" in step S8), then the system control unit 56 judges whether or not all of the image data are received (step S9). If the system control unit 56 judges that all of these image data are received ("YES" in step S9), then the data receiving process operation by the system control unit 56 is accomplished.

As the method for producing the duplication data defined in the step S7, there are the following two methods. A first explanation is made of a first method by employing FIGS. 13A to 13D.

Figure 13A:
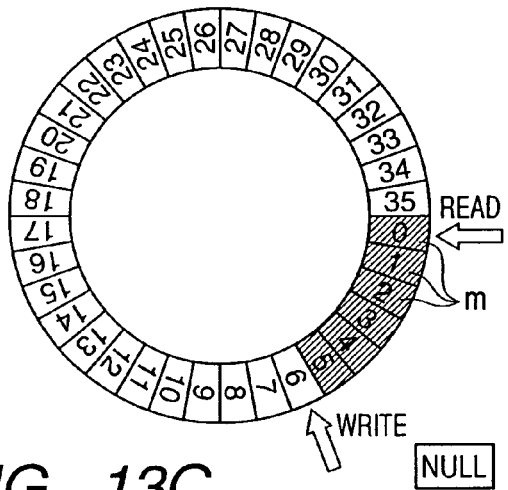
FIGS. 13A to 13D are diagrams for explaining reading/writing operations of image data with respect to the buffer memory.
Figure 13B:
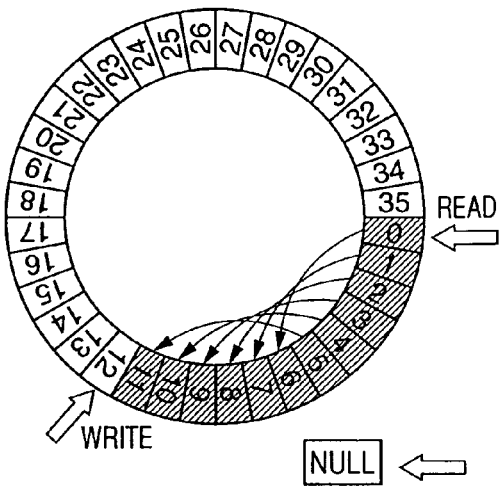
Figure 13C:
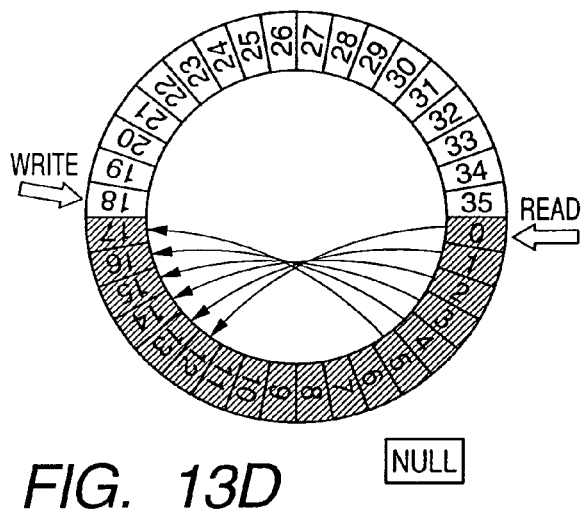
Figure 13D:
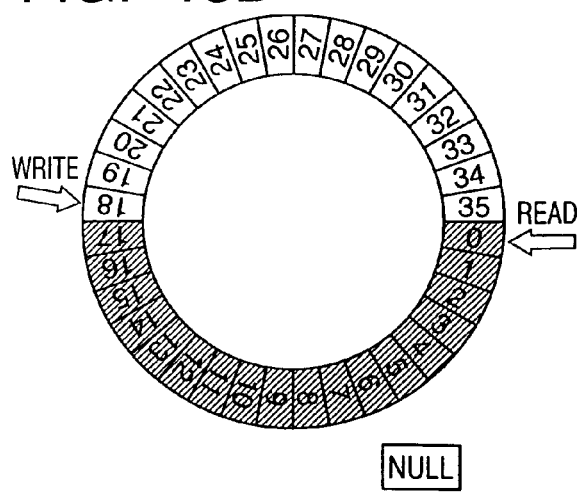

In the step S3, as shown in FIG. 13A, the system control unit 56 writes the received image data into 6 pieces of the storage regions "m" (first storage region) having the region numbers "0" to "5". Then, in the step S7, as shown in FIG. 13B, the system control unit 56 produces duplication data from the image data written in the storage regions "m" (first storage region) having the region numbers "0" to "5", and then, writes the produced duplication data into 6 pieces of the storage regions "m" (second storage region) having the region numbers "6" to "11". In the drawing, the storage regions "m" pointed by bases of arrows imply production sources of the duplication data, whereas the storage regions "m" pointed by designations of arrows imply production destinations of the duplication data (these implications may be similarly applied to following FIGS. 14A to 14F and FIGS. 17A to 17E). That is to say, the system control unit 56 duplicates the image data of the storage region "m" having the region number "0", and writes the duplication data into the storage region "m" having the storage number "6"; the system control unit 56 duplicates the image data of the storage region "m" having the region number "1", and writes the duplication data into the storage region "m" having the region number "7"; the system control unit 56 duplicates the image data of the storage region "m" having the region number "2", and writes the duplication data into the storage region "m" having the storage number "8"; the system control unit 56 duplicates the image data of the storage region "m" having the region number "3", and writes the duplication data into the storage region "m" having the region number "9"; the system control unit 56 duplicates the image data of the storage region "m" having the region number "4", and writes the duplication data into the storage region "m" having the region number "10"; and further, the system control unit 56 duplicates the image data of the storage region "m" having the region number "5", and writes the duplication data into the storage region "m" having the storage number "11". As described above, since Nw=3, the system control unit 56 is required to produce another duplication data. As a consequence, as indicated in FIG. 13C, the system control unit 56 produces duplication data from the image data which are written in the storage regions "m" (first storage regions) having the region numbers "0" to "5", and then, writes the produced reproduction data into axis pieces of the region numbers "12" to "17." As a result, 1 piece of the image data and (Nw−1=2) pieces of the duplication data are prepared on the buffer memory 60.

Next, a description is made of a second method with reference to FIGS. 14A-14F.

Figure 14A:
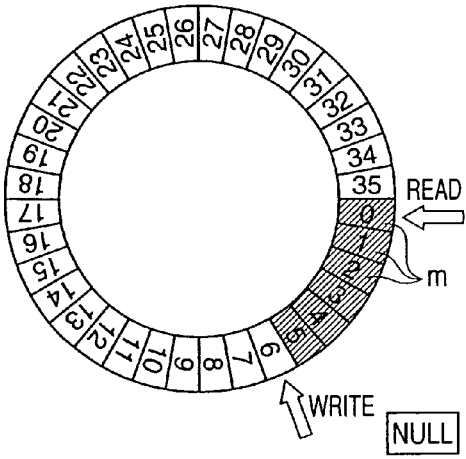
FIGS. 14A to 14F are diagrams for explaining reading/writing operations of image data with respect to the buffer memory.
Figure 14B:
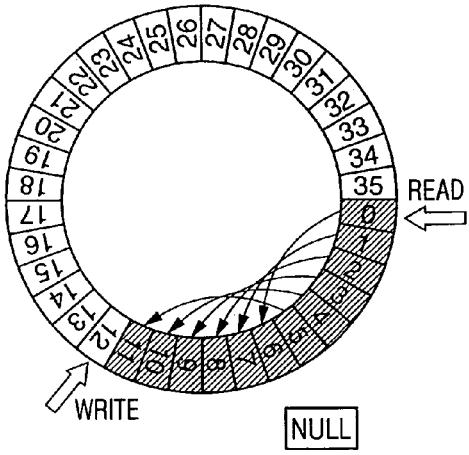

In the step S3, as shown in FIG. 14A, the system control unit 56 writes the received image data into 6 pieces of the storage regions "m" (first storage region) having the region numbers "0" to "5". Then, in the step S7, as shown in FIG. 14B, the system control unit 56 produces duplication data from the image data written in the storage regions "m" (first storage region) having the region numbers "0" to "5", and then, writes the produced duplication data into 6 pieces of the storage regions "m" (second storage region) having the region numbers "6" to "11." All of the above-explained operations are identical to those of the above-described first method.

Figure 14C:
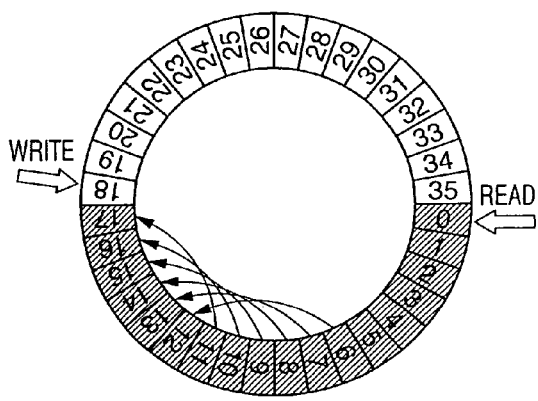
Figure 14D:
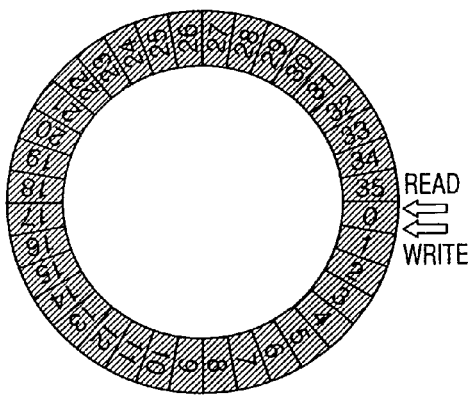

Subsequently, the system control unit 56 commences a second process operation for producing duplication data. In this second duplication process operation, as shown in FIG. 14C, the system control unit 56 furthermore produces duplication data from the above-described duplication data which are written into the storage areas "m" (second storage area) having the region numbers "6" to "11", and then, writes the produced duplication data into 6 pieces of the storage regions "m" (second storage region) having the region numbers "12" to "17". In other words, the system control unit 56 duplicates the image data of the storage region "m" having the region number "6", and writes the duplication data into the storage region "m" having the storage number "12"; the system control unit 66 duplicates the image data of the storage region "m" having the region number "7", and writes the duplication data into the storage region "m" having the region number "13"; the system control unit 56 duplicates the image data of the storage region "m" having the region number "8", and writes the duplication data into the storage region "m" having the storage number "14"; the system control unit 56 duplicates the image data of the storage region "m" having the region number "9", and writes the duplication data into the storage region "m" having the region number "16"; the system control unit 56 duplicates the image data of the storage region "m" having the region number "10", and writes the duplication data into the storage region a "m" having the storage number "16"; and further, the system control unit 56 duplicates the image data of the storage region "m" having the region number "11", and writes the duplication data into the storage region "m" having the region number "17". As described above, when the system control unit 56 produces 2, more pieces of the duplication data, the system control unit 56 produces the duplication data from the finally written duplication data, and then, writes this produced duplication data into such a storage area "m" subsequent to the storage area "m" into which the above-explained duplication data is finally written.

The second method has the following merits, as compared with those of the first method.

Figure 14E:
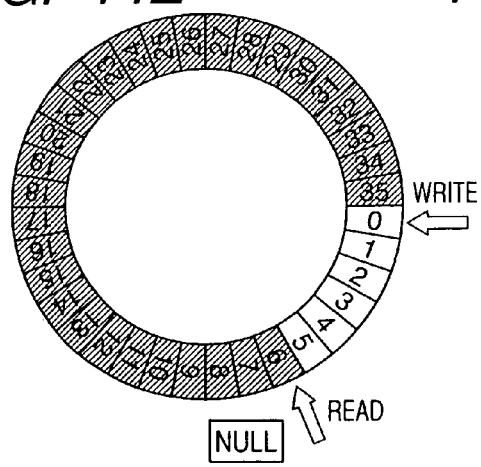
Figure 14F:
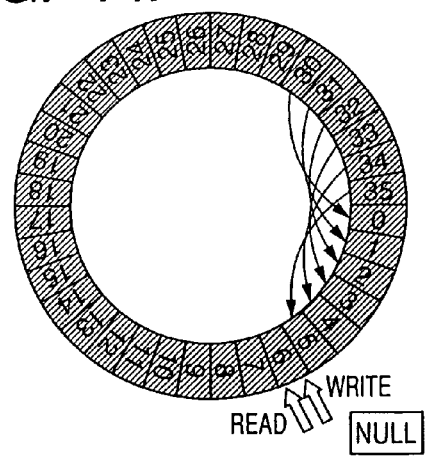

FIGS. 13A-13D and FIGS. 14A to 14F are the diagrams for describing the method when Nw=3. On the other hand, for instance, when Nw=7, both image data and duplication data whose amount exceeds the storage capacity of the buffer memory 60 must be buffered. In the case of the above-described second method, at the time when the duplication data are produced 5 times, the storage condition of the buffer memory 60 constitutes that shown in FIG. 14D. When such a storage condition of FIG. 14D becomes, the system control unit 56 judges that there is no empty storage region capable of writing the duplication data in the step S6 of FIG. 12 ("NO" in step S6). As a consequent, if the system control unit 56 is merely brought into a waiting status, then the system control unit 66 will commence a data reading operation soon, so that the READ pointer starts to be moved. Then, as shown in FIG. 14E, if 6 pieces of the storage regions "m" capable of writing the duplication data become empty ("YES" in step S6), then the system control unit 56 further produces duplication data from the above-described duplication data which are written in the storage regions "m" up to the region numbers "30" to "35", and writes these produced reproduction data into 6 pieces of the storage regions "m" up to the region numbers "0" to "5" (refer to FIG. 14F). As described above, in accordance with the second method, since the duplication data are produced from the previously produced duplication data, both the image data and the duplication data whose amounts exceed the storage capacity of the buffer memory 60 can be prepared. In contrast to the second method, in accordance with the first method, the following drawback is present. That is, when the image data written in 6 pieces of the storage regions "m" up to the region numbers "0" to "5" are read out by the READ pointer, the image data are no longer left in these storage regions "m", so that the duplication data thereof cannot be produced. As a consequence, it is preferable to determine whether the first method, or the second method may be employed with considering the relationship between the overwriting times and the storage capacity of the buffer memory 60.

When only necessary number of the duplication data are formed in the above-described manner, the system control unit 56 sequentially reads both the image data and the duplication data from the buffer memory 60, and then, supplies the read image data and duplication data to the encoder 52. The encoder 52 EFM-modulates these image data and duplication data so as to be converted into the NRZI signal (refer to the bit string of FIG. 9), and then, modulates the NRZI signal to obtain the NRZI fragmental signal WEN (refer to DOTX of FIG. 9) having the duty ratios defined in response to the gradation values of the respective pixels which constitute the image data. This NRZI fragmentary signal WEN is supplied via the ALPC circuit 50 to the laser driver 48. The laser driver 48 modulates the drawing-purpose laser light based upon the NRZI fragmentary signal WEN. The modulated drawing-purpose laser light is emitted from the optical pickup 34 and then is irradiated onto the drawing layer 106b of the optical disk 1.

Figure 15:
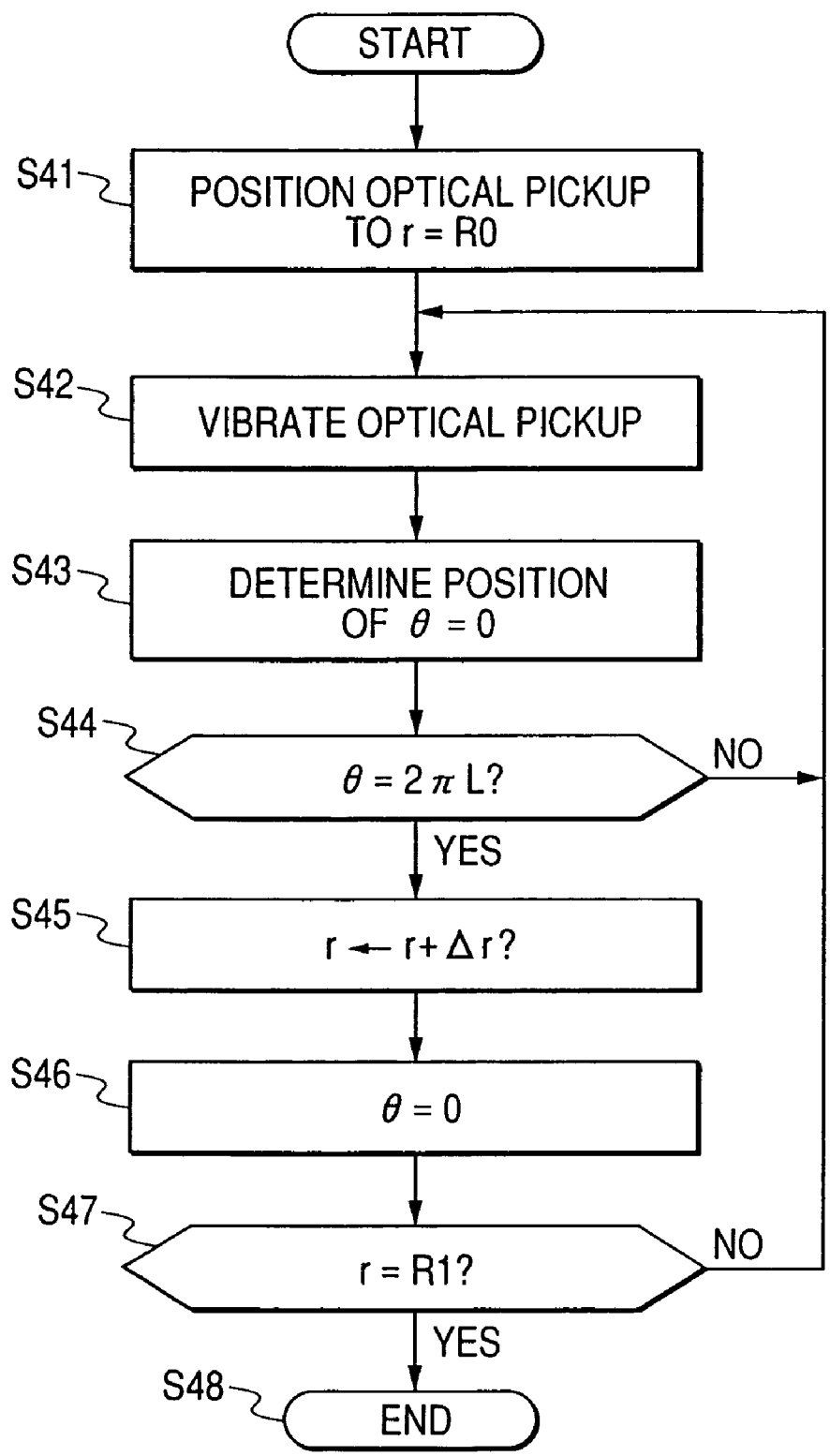
FIG. 15 is a flow chart for describing a process operation in which the system control unit 56 performs a drawing operation.

Referring now to FIG. 15, a more detailed description is made of the above-explained drawing process operation.

A drawing process operation is carried out in such a manner that while the optical disk 1 is rotated, the optical pickup 34 is sequentially moved in the radial direction of the optical disk 1. As a consequence, it is convenient to express image data employed in the drawing process operation by polar coordinates that a rotation center position of the optical disk 1 constitutes a pole. Under such a circumstance, coordinate positions of respective pixels which constitute the image data are expressed respectively by employing such polar coordinates (r, θ) that a radius vector is assumed as "r" and an angle of deviation "θ" is increased from an original line in a left turning direction (namely, counter clockwise direction). The system control unit 56 positions an optical axis position of the objective lens 33 of the optical pickup 34 in the disk radial direction with respect to a write-starting radial position "R0" before the drawing process operation is commenced (step S41). This positioning control operation may be realized as follows: That is, the stepper motor 36 is driven so as to once return the optical pickup 34 in the inner circumferential direction, and if an original point position of the innermost circumference (either position detected by limit switch or position where optical pickup 34 is mechanically engaged by stepper) is detected, then the stepper motor 36 is driven by a certain step number by which the objective lens 33 may be reached from this detected position to a write-starting radial position "R0". Subsequently, a vibration signal is generated from the vibration signal generator 46, and this vibration signal is supplied to a tracking actuator (not shown) of the optical pickup 34 in order that the objective lens 33 is vibrated in a constant time period in the disk radial direction (step S42). Since a frequency Hz of the vibration is set to be a larger frequency value than the spindle rotation number rps, the objective lens 33 is vibrated for 1, or more longer time period per 1 rotation of the spindle. This vibration is continuously performed until the drawing process operation is accomplished. It should also be understood that the tracking servo control is turned off when the drawing process operation is carried out.

In the case that the objective lens 33 is vibrated by receiving the vibration signal, it is desirable that the system control unit 56 sets values as to "frequency Hz of vibrations" and "spindle rotation number rps" in such a manner that a value of "vibration frequency Hz/spindle rotation number rps" becomes a recurring decimal having a long recurring digit number. In other words, if these values are set under the above-described ratio value, that even when a total number of overwriting times becomes larger, the irradiation positions of the laser light are not overlapped with each other during the overlapping operation. For instance, if the frequency of the vibration is set to 200 Hz with respect to the spindle rotation number of 131.25 rps, then a ratio value of "vibration frequency Hz/spindle rotation number rps" becomes the recurring decimal having the long recurring digit number.

When the spindle motor 30 is stably controlled in the CAV control mode based upon a predetermined rotation number, and further, the optical axis position of the objective lens 33 of the optical pickup 34 in the disk radial direction is reached to such a condition that the optical axis position is located at the write starting radial position "R0", a drawing operation is commenced from an arbitrary position of the circumferential direction. The system control unit 56 determines this position in the circumferential direction where the drawing operation is commenced as θ=0 (step S43). While the drawing operation is carried out, the system control unit 56 counts a clock pulse so as to detect a position of the circumferential direction with respect to the position of θ=0 every the above-described "Δθ" (difference in deviation angles between adjacent pixels to be drawn in the circumferential direction), while the above-described clock pulses are produced by frequency-dividing the same crystal oscillator clock pulses as those employed in the CAV control operation of the spindle motor 30. It should also be understood that symbol "Δθ" indicates a difference in deviation angles between pixels located adjacent to each other and to be drawn in the circumferential direction. The value of this deviation angle difference "Δθ" may be calculated by calculating a total drawing number per Δθ=2π/1 turn based upon a total drawing number per 1 turn of the optical disk 1.

Then, when the circumferential direction position reaches θ=2π×L (step S44), the system control unit 56 judges that the optical disk 1 is rotated by plural times which are designated by the overwriting number "L", and drives the stepping motor 36 by 1 microstep operation so as to move the optical axis position (center position of vibration) of the objective lens 33 over a distance "Δr" in the outer circumferential direction of the optical disk 1 (step S45). The distance "Δr" corresponds to a unit feeding amount of the optical pickup 34 in the disk radial direction of the optical pickup 34, namely, a move amount of the optical pickup 34 by driving the stepper motor 36 by 1 microstep operation. This distance value of "Δr" may be obtained by calculating N/M based upon information as to both "a feeding amount (N) of the optical pickup 34 in the disk radial direction by driving the stepper motor 36 by 1 full step operation", and also, "dividing number (M) of the stepper motor 36 by the microstep operations."

At the circumferential direction position $\theta=2\pi \times L$, the count value of "$\theta$" is returned to 0 (step S46), and the counting operation of "$\theta$" is repeated. The optical axis position of the objective lens 33 is moved by the distance "$\Delta r$" every time "$\theta$" reaches $2\pi \times L$, and if the position of the disk radial direction reaches a writing end radial position "R1" (step S47), then the system control unit 56 accomplishes the drawing process operation (step S48).

As described above, the optical axis position (center position of vibration) of the objective lens 33 in both the disk circumferential direction and the disk radial direction can be synchronized with the encoding operation of the encoder 52 in such a manner that the optical axis position (center position of vibration) of the objective lens 33 of the optical pickup 34 is located at an arbitrary position (r, $\theta$) on the optical disk 1, the drawing operation is carried out by employing such a laser light which is modulated by the NRZI fragmentary signal WEN produced based upon the pixel data of the relevant position (r, $\theta$). Since the CAV control of the spindle motor 30 and the encoding process operation by the encoder 52 are carried out based upon the same crystal oscillating clock pulse, this synchronization may be readily realized.

Figure 16:
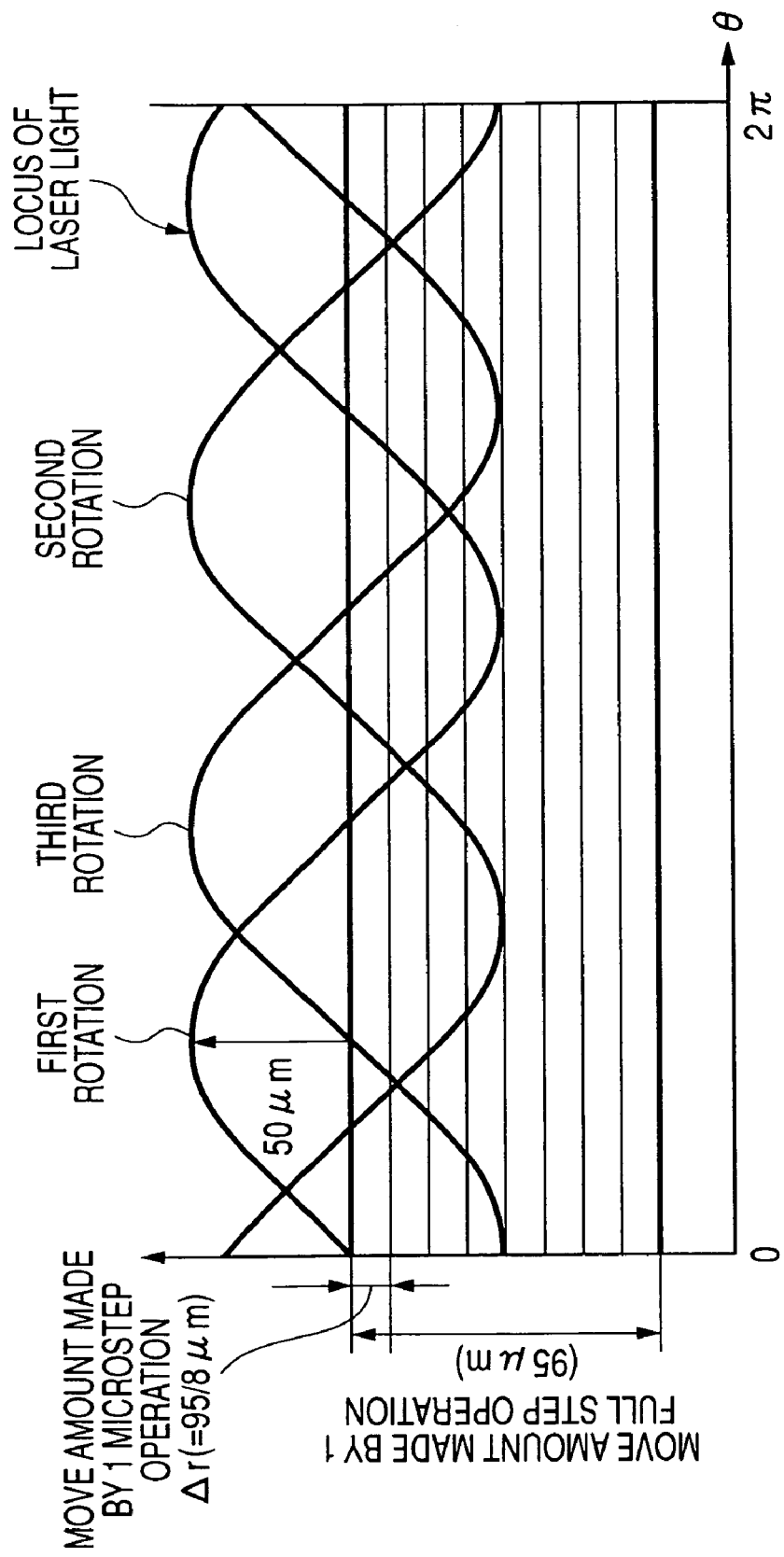
FIG. 16 is a diagram for representing an example as to loci of scanning positions of drawing-purpose laser light at one position in the radial direction in such a case that an overwriting number is set to "3."

FIG. 16 shows an example as to loci of scanning positions of laser light at one position in the disk radial direction in the case that the overwriting number is set to "3". For the sake of convenient explanation, FIG. 16 represents that the circumference of the optical disk 1 is expanded as a straight line. In the example of FIG. 16, it is so assumed that a feeding amount of the optical pickup 34 in the disk radial direction by driving the stepper motor 36 by 1 full step operation is equal to 96 micrometers; a dividing number of the stepper motor 36 by a microstep operation is equal to 8; a move amount "$\Delta r$" of the optical pickup 34 by driving the stepper motor 36 by 1 microstep is equal to N/M=95 μm/8; a move amount "$\Delta r$" of the optical pickup 34 with respect to a vibration amplitude of the laser light=the center position of the vibration is equal to −50 μm and +50 μm; and the vibration number Hz of the laser light/spindle rotation number rps>1 (recurring decimal). In accordance with FIG. 16, the laser light scans such a range in the disk radial direction which is wider than the move amount $\Delta r$ of the optical pickup 34 driven by 1 microstep. Moreover, since the vibration Hz of the laser light/spindle rotation number rps is set to become the recurring decimal, the loci of the laser light are not overlapped with each other every time the optical disk 1 is rotated. As a consequence, even if the respective drawing lines made by the laser light are narrow, then such a drawing operation having a small gap may be realized.

In accordance with the above-described embodiment, the duplication data which are required for the drawing operation are produced by employing the image data received from the host apparatus 10, so that the amount of the data supplied from the host apparatus 10 to the optical disk recording apparatus 12 can be reduced. Also, in accordance with the present embodiment, the duplication data are produced from the image data received from the host apparatus 10. As a result, the writing process operation can be quickly carried out, as compared with such a writing process operation that necessary data are supplied from the host apparatus 10 and the supplied data are written in the buffer memory every time the required data are supplied. As a consequence, it is possible to suppress an occurrence of such an event that when the data reading operation is carried out, the data writing operation cannot be accomplished in time. Namely, it is possible to suppress the occurrence of the "buffer run under error."

(3) Modifications

The above-described embodiment may be alternatively modified as follows:

That is, the buffer memory 60 may not be alternatively formed in the ring buffer type. In short, the buffer memory 60 may be alternatively realized by such a storage which is provided with a first storage region for storing thereinto received image data, and a second storage region for storing thereinto duplication data of the above-described image data. It is preferable that this storage is such a storage that data are read/written in the FIFO form.

Also, in the above-described embodiment, both the reading/writing process operations of the image data, and the reading/writing process operations of the duplication data are carried out with respect to one piece of the buffer memory 60. Alternatively, the storage for reading/writing the image data, and the storage for reading/writing the duplication data may be separately arranged. For example, among the structures shown in FIG. 2, the optical disk recording apparatus 12 may alternatively utilize the memory 62 as the first storage region for reading/writing the image data, and also, may alternatively utilize the buffer memory 60 as the second storage for reading/writing the duplication data. In the memory 62, storage regions "m" similar to those of the buffer memory 60 are provided. Then, as shown in FIG. 17A, the system control unit 56 may alternatively write the received image data into 6 pieces of the storage regions "m" (first storage region) having the region numbers "0" to "5" of the memory 62. Then, as indicated in FIG. 17B, the system control unit 56 may alternatively produce duplication data based upon the image data which are written in the storage regions "m" having the region numbers "0" to "5", and thereafter, may alternatively write the produced duplication data into 6 pieces of the storage regions "m" (second storage region) having the region numbers "0" to "5" of the buffer memory 60. When duplication data is furthermore required, as represented in FIG. 17C, the system control unit 66 may alternatively produce further duplication data based upon the image data which are written in the storage regions "m" having the region numbers "0" to "5", and thereafter, may alternatively write the produced duplication data into 6 pieces of the storage regions "m" (second storage region) having the region numbers "6" to "11" of the buffer memory 60. Similarly, in FIG. 17D, the system control unit 56 may alternatively produce duplication data based upon the image data which are written in the storage regions "m" having the region numbers "0" to "5", and thereafter, may alternatively write the produced duplication data into 6 pieces of the storage regions "m" (second storage region) having the region numbers "12" to "17" of the buffer memory 60. As a result, Nw=3 pieces of the duplication data may be prepared on the buffer memory 60. Then, while the system control unit 56 maintains the position of the optical pickup 34 in the radial direction within a certain range, the system control unit 56 may irradiate the laser light on the drawing layer in response to the duplication data read out from the buffer memory 60.

In the case that both the reading/writing process operations of the image data and the reading/writing process operations of the duplication data are carried out with respect to one piece of the buffer memory 60, when such a data which constitutes a source of duplication data is read out from the buffer memory 60, such a process operation for moving the READ pointer is required. To the contrary, in accordance with the above-described modification mode, this process operation is no longer required, and has such a merit that the pointer control operations may be made with simple contents thereof.

Also, as explained in the above embodiment, the optical disk recording apparatus 12 duplicates the image data received from the host apparatus 10. Alternatively, the received image data may be encoded plural times by the encoder 62 of the optical disk recording apparatus 12. To this end, the optical disk recording apparatus 12 is required to be equipped with such an encoder instead of the encoder 52 of FIG. 2, while the first-mentioned encoder performs an encoding process operation plural times with respect to the same data in such a manner that the same encoding results are obtained in the respective encoding process operations. In this alternative case, the encoder encodes the image data read out from the buffer memory 60 plural times equal to the overwriting times so as to output the encoded image data. Then, while the system control unit 56 maintains the position of the optical pickup 34 in the radial direction within a certain range, the system control unit 56 irradiates the laser light in response to the encoded image data output from the encoder onto the drawing layer from the optical pickup 34. As described above, since the necessary number of image data are produced by the encoder, the amount of the data supplied from the host apparatus 10 to the optical disk recording apparatus 12 can be reduced, and further, it is possible to suppress an occurrence of such an event that when the data reading operation is carried out, the data writing operation cannot be accomplished in time. Namely, it is possible to suppress the occurrence of the "buffer run under error".

The drawing layer of the optical disk 1 may be alternatively realized by such a drawing layer which is merely discolored in response to any one of heat and light. Also, the position of the drawing layer within the optical disk 1 is not limited only to the position shown in FIG. 1, but may be merely provided at a position different from the position of the data recording layer thereof (namely, position of recording surface of optical disk 1, or different distances from label surface). Also, since the optical disk 1 may be provided from various manufactures, it is conceivable that characteristics of data recording layers and drawing layers of optical disks supplied from these manufactures are different from each other. In such a case that thermal absorptances of these data recording layers are different from each other, the following conditions may be supposed: That is, levels of laser light which should be irradiated so as to form pits are different from each other, and also, levels of laser light which should be irradiated so as to discolor the data recording layers are different from each other. The above-described supposed conditions may be similarly applied also to the drawing layers. Therefore, data recording operations and drawing operations may actually carried out with respect to the optical disks 1 supplied from a large number of optical disk manufactures in order to acquire such data that laser light having which levels may be properly irradiated onto these optical disks 1, and the acquired various irradiation data may be stored in the memory 62 in advance. In this alternative case, if the acquired various irradiation data are stored in this memory 61 in correspondence with identification information (disk ID information) indicative of the sorts of these optical disks 1, then the laser light may be irradiated in correspondence with a sort of optical disk 1 set on the optical disk recording apparatus 12 after reading the disk ID information of this set optical disk 1.

In the above-described embodiment, the arbitrary position in the circumferential direction where the drawing operation is commenced is defined as $\theta=0$. Instead of this definition, alternatively, a specific recognition code may be formed on the side of the inner circumference from the drawing region of the optical disk 1. A position of this specific recognition code in the circumferential direction is detected prior to a drawing operation; the detected position may be defined as $\theta=0$; and then, the drawing operation is commenced from this circumferential direction position. If the above-described alternative definition method is employed, even when the optical disk 1 is inserted and/or derived into/from the optical disk recording apparatus 12, since the position of $\theta=0$ is not changed, the drawing operation may be continuously carried out.

It should also be noted that in the above-described embodiment, "the dividing number (M) of the microstep operation of the stepper motor 36" is fixed as "the preset drawing condition." Alternatively, this dividing number "M" may be defined as "a drawing condition which can be set by an operator." As a result, when the drawing operation is carried out, the optical recording apparatus 12 changes the waveforms of the microstep driving-purpose pulses "A" and "B" (refer to FIG. 5) into a stage number in response to the set dividing number "M", and sequentially moves the optical pickup 34 in the radial direction by the microstep move amount in response to the dividing number "M" so as to perform the drawing operation. In this alternative case, such a drawing-purpose image data is employed in which pixel data of a position in the radial direction every microstep move amount in response to the dividing number "M" set (selected) by the operator is extracted from the original image data.

What is claimed is:

1. An optical disk drawing apparatus for drawing an image on a drawing layer of an optical disk, the drawing layer being discolored by receiving any one of heat and light, the apparatus comprising:

a rotating unit that rotates the optical disk;

an irradiating unit that is movable in a radial direction of the optical disk, and irradiates laser light to be focused on the drawing layer of the optical disk rotated by the rotating unit;

a receiver that receives image data indicative of an image drawn on the drawing layer over a time period during which the optical disk is rotated by 1 turn;

a storage having a first storage region and a second storage region;

a writing unit that writes the image data received by the receiver into the first storage region;

a duplication data producer that produces one piece, or plural pieces, of duplication data as to the image data written in the first storage region, in such a manner that a number of pieces of the duplication data corresponds to n−1, where n is a number of overwriting operations to be performed on the optical disk, and writes the produced duplication data in the second storage region; and a drawing unit that causes the irradiating unit to irradiate the laser light onto the drawing layer according to the image data and the duplication data read from the storage while a position of the irradiating unit in the radial direction is maintained within a certain range and the optical disk is rotated by the rotating unit by plural turns.

2. The apparatus according to claim 1, wherein the storage reads and writes the data in an FIFO (First-In First-Out) form, and the second storage region is subsequent to the first storage region, and the duplication data producer produces one piece, or plural pieces of the duplication data from the image data written in the first storage region, and writes the produced duplication data in the second storage region in the producing order of the duplication data.

3. The apparatus according claim 1, wherein
the storage reads and writes the data in the FIFO form, and the second storage region is subsequent to the first storage region,
the duplication data producer produces one piece of the duplication data from the image data written in the first storage region, and writes the produced duplication data with respect to the second storage region, and
when the duplication data producer further produces another duplication data, the duplication data producer repeats a process operation that the duplication data producer produces duplication data from the finally written duplication data, and writes the produced duplication data into a third storage region subsequent to the second storage region into which the duplication data is finally written.

4. The apparatus according to claim 1, wherein
the storage reads and writes the data in the FIFO form, and
when a data writable storage region is not present in the storage, the duplication data producer is brought into a waiting status until the data writable storage region becomes empty, and
when the data writable storage region becomes empty, the duplication data producer writes the duplication data in the data writable storage region as the second storage region.

5. The apparatus according to claim 1, wherein the irradiating unit vibrates the laser light in the radial direction so that loci of the laser light on the drawing layer are not overlapped with each other every time the optical disk is rotated.

6. The apparatus according to claim 1, wherein the overwriting is performed in a state that a position of the irradiating unit in a radial direction is maintained within a certain range.

7. The apparatus according to claim 1, wherein the image data received by the receiver and stored in the first storage region corresponds to an image for one turn of the optical disk.

8. An optical disk drawing apparatus for drawing an image on a drawing layer of an optical disk, the drawing layer being discolored by receiving any one of heat and light, the apparatus comprising:
   a rotating unit that rotates the optical disk;
   an irradiating unit that is movable in a radial direction of the optical disk, and irradiates laser light to be focused on the drawing layer of the optical disk rotated by the rotating unit;
   a receiver that receives image data indicative of an image drawn on the drawing layer over a time period during which the optical disk is rotated by 1 turn;
   a storage that includes a first storage having a first storage region and a second storage having a second storage region in which data are read and written in the FIFO form,
   a writing unit that writes the image data received by the receiver into the first storage region:
   a duplication data producer that produces plural pieces of the duplication data from the image data written in the first storage in such a manner that a number of pieces of the duplication data corresponds to a number of overwriting operations to be performed on the optical disk, and writes the produced duplication data in the second storage in the producing order of the duplication data, and
   a drawing unit that causes the irradiating unit to irradiate the laser light onto the drawing layer according to the duplication data read from the second storage while a position of the irradiating unit in the radial direction is maintained within a certain range and the optical disk is rotated by the rotating unit by plural turns.

9. A method of drawing an image on a drawing layer of an optical disk, the drawing layer being discolored by receiving any one of heat and light, the method comprising:
   rotating the optical disk;
   receiving image data indicative of an image drawn on the drawing layer over a time period during which the optical disk is rotated by 1 turn;
   writing the image data received by the receiver into a first storage region of a storage;
   producing one piece, or plural pieces, of duplication data as to the image data written in the first storage region in such a manner that a number of pieces of the duplication data corresponds to n−1, where n is a number of overwriting operations to be performed on the optical disk, and writes the produced duplication data in a second storage region of the storage; and
   irradiating laser light to be focused on the drawing layer of the rotated optical disk according to the image data and the duplication data read from the storage while a position of the irradiating unit in an radial direction of the optical disk is maintained within a certain range and the optical disk is rotated by the rotating unit by plural turns.

10. The method according to claim 9 further comprising moving a light source of the laser light in the radial direction after the irradiating the laser light.

* * * * *